United States Patent [19]

Nossen

[11] 4,278,977
[45] Jul. 14, 1981

[54] RANGE DETERMINING SYSTEM

[75] Inventor: Edward J. Nossen, Cherry Hill, N.J.

[73] Assignee: RCA Corporation, New York, N.Y.

[21] Appl. No.: 36,012

[22] Filed: May 4, 1979

[51] Int. Cl.³ ............................................. G01S 13/78
[52] U.S. Cl. .................................................. 343/6.5 LC
[58] Field of Search ...................... 343/6.5 R, 6.5 LC

[56] References Cited

U.S. PATENT DOCUMENTS

| | | | |
|---|---|---|---|
| 3,530,467 | 9/1970 | Attwood et al. | 343/6.5 LC X |
| 3,530,470 | 9/1970 | Sheftelman | 343/6.5 LC |
| 3,900,873 | 8/1975 | Bouvier et al. | 343/6.5 R X |
| 4,012,696 | 3/1977 | Fletcher et al. | 343/6.5 LC X |
| 4,045,796 | 8/1977 | Kline, Jr. | 343/6.5 LC X |
| 4,128,835 | 12/1978 | Russell | 343/6.5 LC |

*Primary Examiner*—T. H. Tubbesing
*Attorney, Agent, or Firm*—Samuel Cohen; Robert L. Troike; Donald W. Phillion

[57] ABSTRACT

A range finding method and system comprising an interrogator and a transponder. The interrogator generates a signal with a first portion comprising a carrier signal amplitude modulated by a first two-level iterative pseudo random sequence (PRS) whose level changes coincide with level changes of a first two-level tone of frequency $f_T$, which phase modulates said first portion. A second portion of the signal is phase modulated by the product of the PRS and said first tone. The transponder tracks the received interrogation signal and then generates and transmits a responsive signal having first and second portions comprised of a carrier signal phase modulated by a second two-level tone phase synchronized with the received first tone. The first portion is further amplitude modulated by a second iterative PRS phase synchronized with the received PRS signal, and the second portion is further phase modulated by the second, phase synchronized PRS. In response to the responsive signal, the interrogator generates a tracking tone of frequency $f_T$, precisely phase locked by means including an arithmetic synthesizer, with the received second tone. The phases of the received second PRS and the originally generated first PRS are compared to determine the round-trip signal propagation time and thus the range.

9 Claims, 11 Drawing Figures

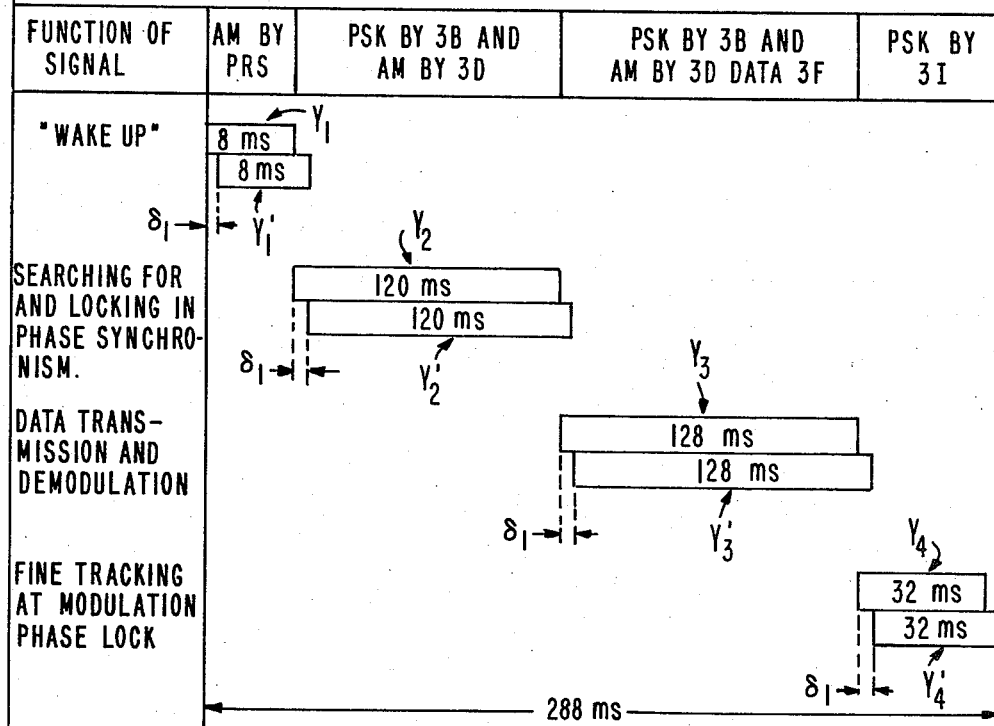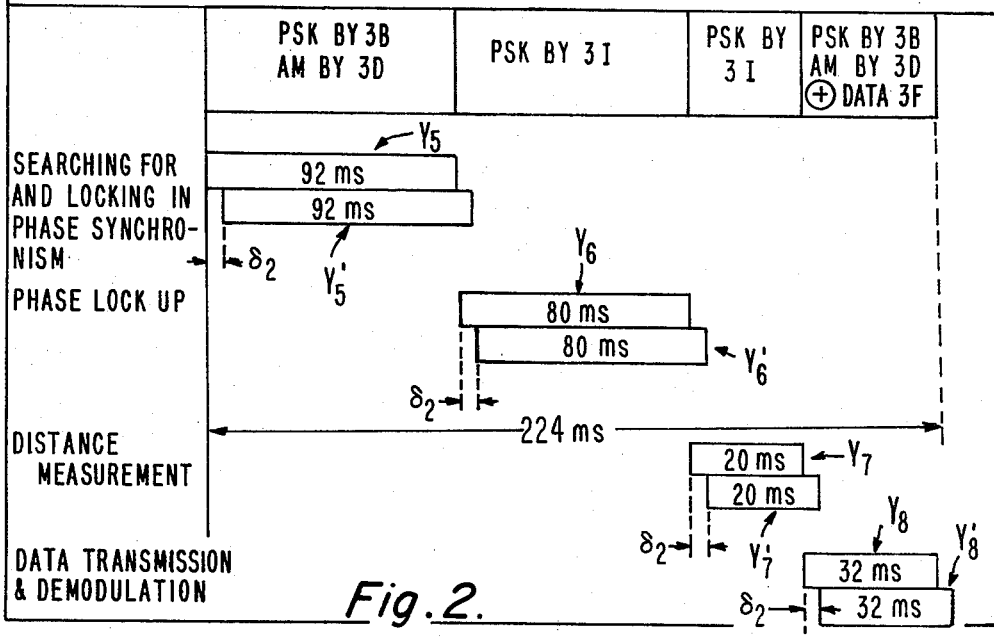
Fig. 2.

| NATURE OF RF CARRIER MODULATED SIGNALS ||||| 
|---|---|---|---|---|
| INTERROGATION SIGNAL FROM INTERROGATOR TO TRANSPONDER |||||
| SIGNAL TRANSMITTED FROM INTERROGATOR | TIME DURATION | CORRESPONDING WAVE FORMS SHOWN IN FIG.3 | SIGNAL RECEIVER AT TRANSPONDER | FUNCTION |
| $Y_1 \rightarrow$ AM by PRS | 8 ms | 3D | $Y_1' \rightarrow$ AM by PRS | WAKE UP |
| $Y_2 \rightarrow$ PSK by 32KHz AM by PRS | 120 ms | 3E | $Y_2' \rightarrow$ PSK by 32 KHz AM by PRS | PHASE LOCK UP |
| $Y_3 \rightarrow$ PSK by 32 KHz AM by PRS WITH DATA ENCODED | 128 ms | 3H | $Y_3' \rightarrow$ PSK by 32 KHz AM by PRS-DATA ENCODED | CONTINUED PHASE LOCK UP AND DATA DECODED |
| $Y_4 \rightarrow$ PSK/PSK- 32KHz $\oplus$ PRS | 32 ms | 3J | $Y_4' \rightarrow$ PSK/PSK 32 KHz $\oplus$ PPS | FINE TRACKING |
| RESPONSIVE SIGNAL FROM TRANSPONDER BACK TO INTERROGATOR |||||
| FUNCTION | RECEIVED AT INTERROGATOR | CORRESPONDINGS WAVE FORM SHOWN IN FIG.3 | TIME DURATION | TRANSMITTED FROM TRANSPONDER |
| SEARCH & PHASE LOCK UP | $Y_5' \rightarrow$ PSK by 32KHz AM by PRS | 3E | 92 ms | $Y_5 \rightarrow$ PSK by 32KHz AM by PRS |
| CONTINUED PHASE LOCK UP | $Y_6' \rightarrow$ PSK by 32KHz $\oplus$ PRS | 3J | 80 ms | $Y_6 \rightarrow$ PSK by 32 KHz $\oplus$ PRS |
| DISTANCE MEASUREMENT | $Y_7' \rightarrow$ PSK by 32KHz $\oplus$ PRS | 3J | 20 ms | $Y_7 \rightarrow$ PSK by 32KHz $\oplus$ PRS |
| CONTINUED PHASE LOCK UP DATA DECODING | $Y_8' \rightarrow$ PSK by 32KHz AM by PSR DATA ENCODED | 3H | 32 ms | $Y_8 \rightarrow$ PSK by 32 KHz AM by PRS WITH DATA ENCODED |

*Fig. 4.*

RANGE DETERMINING SYSTEM

The United States Government has rights in this invention in accordance with the terms of Contract No. u/F33562-78-C-0177, awarded by the Department of the Air Force.

This invention relates generally to range determining methods and systems and, more particularly, to a range determining system that can be employed with, and as a part of, a two-way communication system, such as an instance where two parties each have a transceiver.

In many situations two parties or two stations with two-way communication have a need to know where they are with respect to each other, i.e., the distance between them and the direction. Typical applications include aircraft searching for survivors from some disaster such as an airplane crash or a flood, with the obvious need to identify the disaster site for rescue purposes. Other examples are rendezvousing of ships or of aircraft for refueling purposes, or of border patrol officers operating in regions of poor visibility and requesting assistance from aircraft or helicopters. While both range finders and direction finders are well known in the art, they usually are separate equipments.

The present invention is directed primarily to a range finder and in particular, to a range finder that can be employed with a voice radio without seriously disturbing the function of the radio and also without the inherent delay characteristics of the radio which ordinarily would interfere with the range finding function. The physical size of the range finding logic is small and can easily be incorporated within a walkie-talkie, for example. A fair degree of direction finding also can be obtained with the range finder if one of the parties is highly mobile, such as an airplane or a helicopter for example, by observing the range rate change as the aircraft's direction is changed. The combination of a small, mobile transceiver with a range finder forms a relatively inexpensive and mobile unit particularly suitable in situations of the type mentioned above.

U.S. Pat. No. 3,530,470 to Sheftelman et al. discloses a ranging system wherein a carrier signal, phase modulated by a pseudo random sequence (PRS), is transmitted from a transmitter to a transponder which retransmits the same or another pseudo random code back to the transmitter. The range is determined by measuring the elapsed time between the originally transmitted PRS and the PRS received back from the transponder. As will be seen later herein, no tone corresponding to the 32 kHz tone of the present invention combined with a PRS in various manners to form different modulating signals is employed in the '470 patent. Such tone enables the computation of range to a much finer precision, particularly when employed with an arithmetic synthesizer, and also enables the combination of a range finder with a voice radio, a feature which is not taught in the '470 patent and which appears to be incompatible with the structure disclosed therein.

In a preferred form of the present invention an interrogator generates an interrogation signal comprising a carrier signal modulated by a signal which is a concurrent function of a first two-level tone of frequency $f_T$ and a first iterative two-level pseudo random sequence (PRS) whose level transitions coincide with level transitions of said first tone.

In response to the interrogation signal, a responder generates a first tracking signal which identifies the times of occurrence of the propagation delayed phases of said first tone and said first PRS. The responder then generates a responsive signal comprising a carrier signal modulated by a signal which is a concurrent function of a second two-level tone of frequency $f_T$ and a second iterative PRS whose phases are the same as the propagation delayed phases of said first tone and said first PRS.

In response to the responsive signal, the interrogator generates a second tracking signal which identifies the times of occurrence of the propagation delayed phases of the second tone and the second PRS. Means then determine the phase difference between said first PRS, before transmission, and the propagation delayed second PRS, from which difference the range between the interrogator and responder is calculated.

In the drawings:

FIG. 2 is a timing diagram showing the nature of the various portions of, and the general relationship between, the encoded signal transmitted from the interrogator to the receiver (transponder) and the responsive signal transmitted back to the interrogator, and also the propagation time delays of both signals;

FIG. 4 is a chart showing the make-up and time durations of each portion of the interrogation signal and the responsive signal, including its function and with cross reference to the waveforms of FIG. 3 to facilitate identification of the shape of the waveform of each portion of the interrogation and responsive signals;

Figure 10:
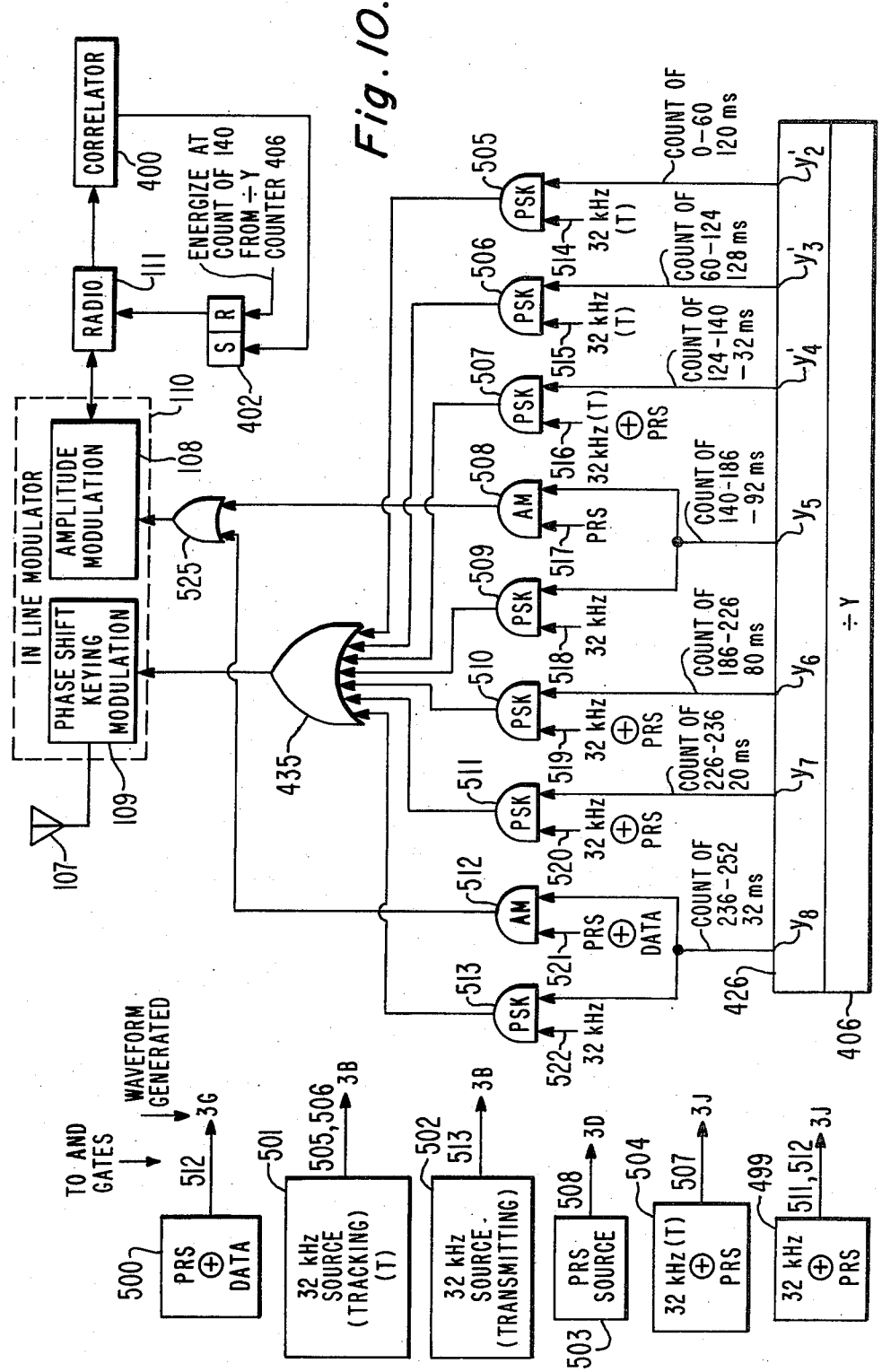
Figure 11:
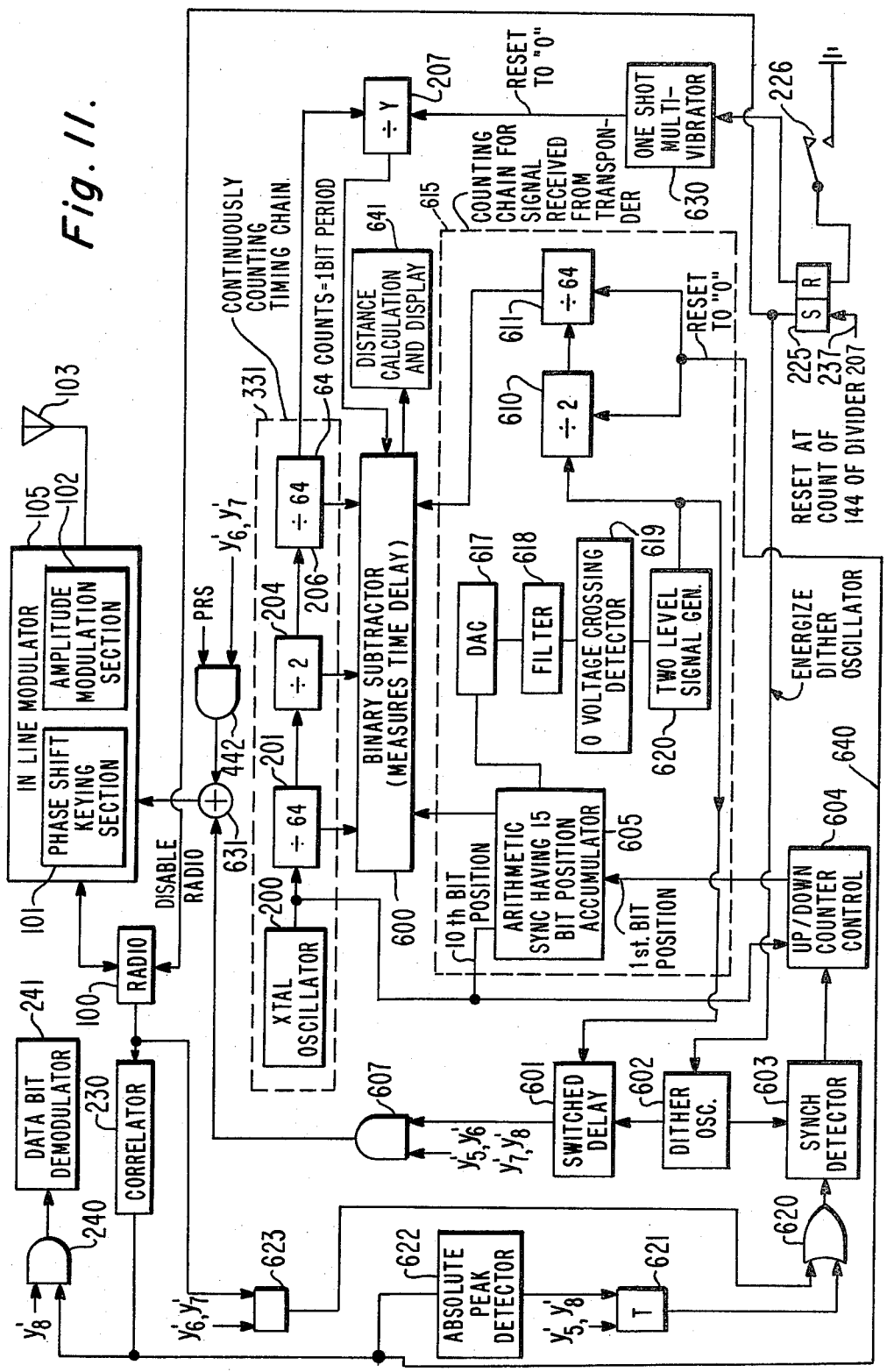

FIG. 10 is a combination logic and block diagram of the timing means of the transponder and the gating logic controlled thereby and the various signal portions generated by activation of various combinations of such gating logic; and FIG. 11 is a block diagram of the logic employed to determine the elapsed time occurring between the transmission of the interrogation signal and the reception of the responsive signal back from the transponder, from which elapsed time the range distance is calculated.

Figure 1:
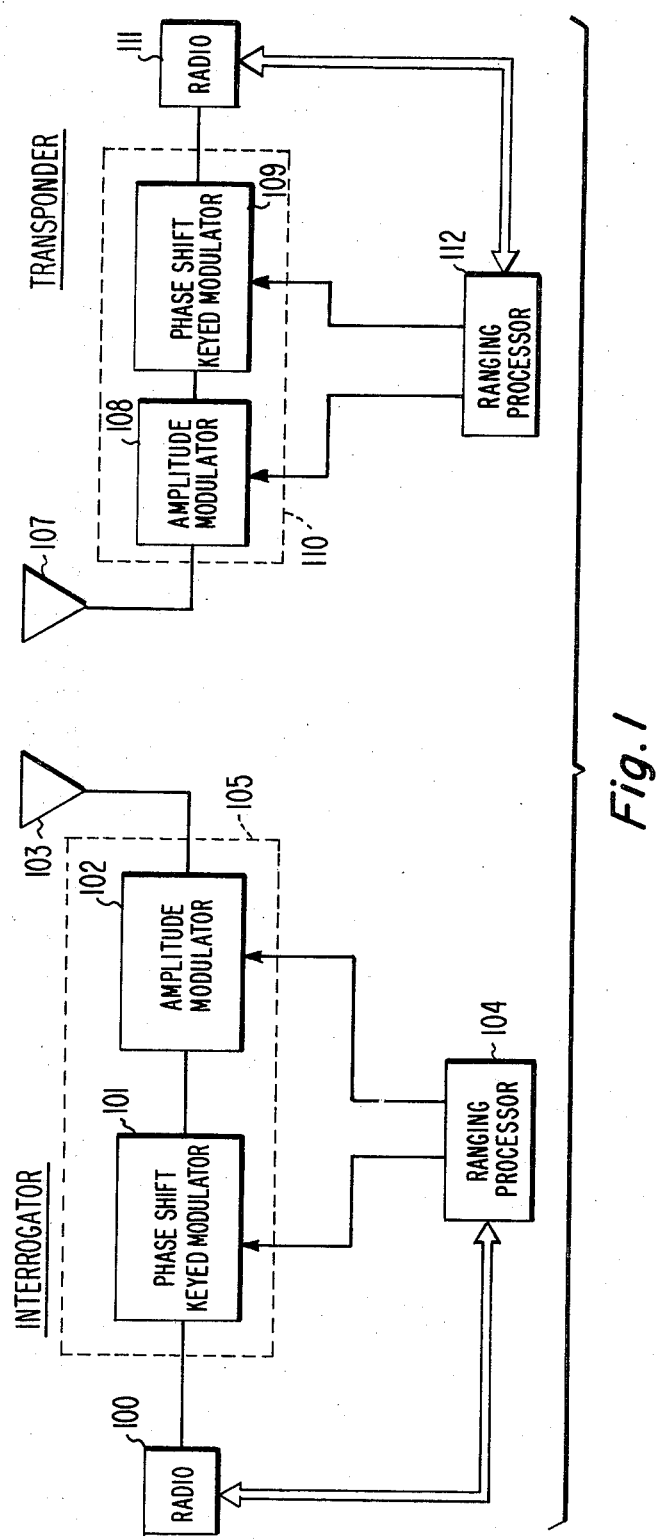
FIG. 1 is a generalized block diagram of a system embodying the invention.

The form of the invention shown in FIG. 1 consists of an interrogator and a transponder. The interrogator is comprised of an amplitude modulated radio 100, an in-line modulator 105 capable of either phase shift keyed (PSK) modulation or amplitude modulation (AM) of the carrier signal of radio 100 in an encoded manner, under control of a ranging processor 104, and which transmits such PSK or AM encoded modulated signals (herein referred to as interrogation signals) to the transponder via antenna 103.

The transponder, which also comprises an in-line modulator 110, a radio 111 and a ranging processor 112, is constructed to identify and track the received interrogation signal by locally generating a 32 kHz tracking signal and an iterative PRS sequence which become phase locked with a 32 kHz tone and an iterative PRS sequence contained in the received interrogation signal.

At the end of the reception of the interrogation signal, whose length is precisely known by counters in the transponder, the transponder, under control of its ranging processor, becomes a transmitter, and transmits back to the interrogator a responsive signal, consisting of a carrier signal encoded in various combinations of PSK and AM modulation by the locally generated 32 kHz tone and PRS sequence.

As mentioned above, both the interrogation and responsive signals are divided into portions, with each portion of a known length and consisting of known types of modulation. The in-line modulators 105 and 110 of the interrogator and the transponder are designed, under control of ranging processors 104 and 112, respectively, to both modulate and demodulate the coded signals passing between the interrogator and the transponder.

Both the interrogator and the transponder divide their generated signals into data bit lengths with each data bit being equal to 64 cycles of the 32 kHz basic tone frequency. Thus, each data bit has a time length of 2 milliseconds. An electrical signal will propagate about 187 miles per millisecond so that if the target is less than 187 miles from the interrogator, the phase displacement of a transmitted bit period from the same bit period received back from the transponder would be less than the bit period duration. In other words, if the propagation time from the interrogator to the transponder is $\delta_1$ and the propagation time back to the interrogator is $\delta_2$, the total round-trip transmit time is $\delta_1 + \delta_2$, which will be less than a bit period of 2 milliseconds if the round-trip distance is less than 374 miles.

To measure such a time displacement, the interrogator continues to generate its 32 kHz signal with no phase shift therein, or in the data bit period, after its interrogation signal has been transmitted. Since the transponder synchronizes with the received interrogation signal and then, upon termination thereof, immediately generates and transmits its encoded responsive signal back to the interrogator, with no phase shift of the 32 kHz signal or bit period at the transponder, the only phase shift that can occur is due to the propagation time of the signals.

Further, since the bit length of all data bits are the same, being based on the 32 kHz signal (disregarding Doppler effect), any data bit period received by the interrogator from the transponder can be phase compared with any bit period that the interrogator has continued to generate, after sending its original interrogation signal, in order to determine the phase displacement between the data bit periods of the transmitted interrogation signal and the received responsive signal.

The round-trip distance between the interrogator and the transponder is the phase displacement $(\delta_1 + \delta_2)$ of the two compared bit periods, multiplied by c, the velocity of light.

In order to more easily understand the structure of the invention, a detailed knowledge of the composition of the transmitted encoded signal and the responsive signal from the transponder will be described first. Consider FIGS. 2, 3 and 4 together.

Figure 3:
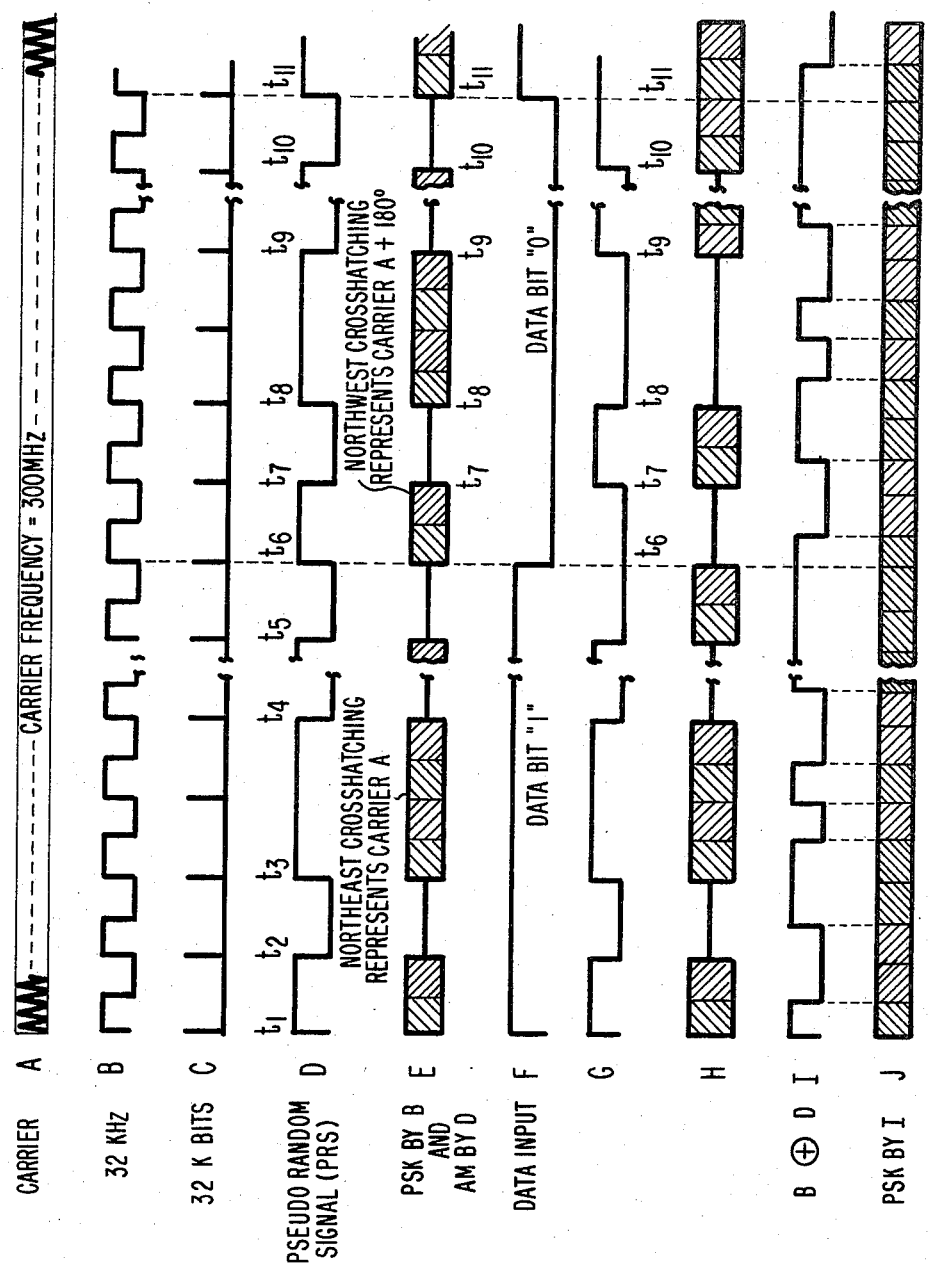
FIG. 3 is a set of waveforms showing the signal components employed to make up, in various combinations, the various portions of the interrogation and responsive signals.

Because the waveforms shown in FIG. 3 will be referred to frequently herein, the following notation will be employed for purposes of clarity and brevity.

Hereafter, each waveform of FIG. 3 will sometimes be referred to by its drawing number. For example, the pseudo random sequence (PRS) shown as waveform D in FIG. 3 will hereafter be referred to as signal 3D. The drawing number will also sometimes be used to designate the lead on which the signal appears.

Further, since the form of modulation, and thus the nature of the signal changes on various input and output terminals during the interrogation and responsive signals, the upper case $Y_n$ and $Y'_n$ notation will be employed to denote which portion of such signals are being transmitted or received with corresponding lower case y's indicating the time period of each such signals.

Thus, in FIG. 2 each of the upper case letters $Y_1$, $Y_2$, $Y_3$, $Y_4$, $Y_5$, $Y_6$, $Y_7$ and $Y_8$, and their primes, not only designate a particular segment of an interrogation and responsive signal, as defined in the chart of FIG. 4, but also indicate the time duration thereof, represented specifically by lower case "y's." Thus, the time duration of signal $Y_1$ is $y_1$. The time periods $y_1-y_8$ and $y'_1-y'_8$ are defined by signals from dividers 207 and 406 of FIGS. 7 and 9, respectively.

As further clarification, signal portion $Y_1$ exists during a time interval $y_1$ which is 8 milliseconds long and which represents four data bit periods, or 256 cycles of the 32 kHz tone of signal 3B (waveform B of FIG. 3).

The next portion $Y_2$ of the interrogation signal exists during a time interval $y_2$ equal to 120 milliseconds and is also measured by a counter in the range processor 104 of FIG. 1. Similarly, signal portions $Y_3$ and $Y_4$ exist for periods of 128 and 32 milliseconds, respectively.

As indicated above, the interrogation signal, consisting of the four sections $Y_1-Y_4$ is transmitted to the transponder of FIG. 1 and arrives there a short time $\delta_1$ later, which is the propagation time.

The signal segments labelled $Y'_1-Y'_4$ represent the interrogation signal segments received at the transponder from the interrogator, each of which is delayed by the propagation time $\delta_1$ with respect to the transmission time of the original interrogation signal portions $Y_1-Y_4$.

Before considering the logic of the system, the nature of each of the portions $Y_1-Y_4$ of the interrogation signal and how each of these portions are processed by the transponder to first acquire coarse synchronization and then fine synchronization will be discussed.

FIG. 4 shows in chart form the various characteristics and functions of portions $Y_1-Y_4$ of the transmitted interrogation signal of FIG. 2, and the corresponding portions $Y'_1-Y'_4$ of the interrogation signal as they are received at the transponder. The chart also shows the characteristics and functions of the portions $Y_5-Y_8$ of the responsive signal transmitted from the transponder and the corresponding portions $Y'_5-Y'_8$ as they are received at the interrogator. The chart of FIG. 4 is, in part, a duplication of the information in FIG. 2 in chart form.

Consider again signal portion $Y_1$. As discussed briefly above, FIGS. 2 and 4 show that $Y_1$ is an 8 millisecond signal composed of the RF carrier 3A amplitude modulated by the pseudo random signal 3D. Signal portion $Y_1$ (defined herein as a "wake-up" or alert signal) is received by the transponder of FIG. 9 as $Y'_1$ and passes through in-line modulator 110, radio 111 and into correlator 400 (shown in FIG. 9). The radio 111 detects incoming signal $Y'_1$ to remove the RF carrier, passing only the PRS signal 3D to correlator 400 which establishes correlation with the received PRS signal. The RF carrier is always present in the interrogation and responsive signals until removed by the detector in the radios.

Figure 9:
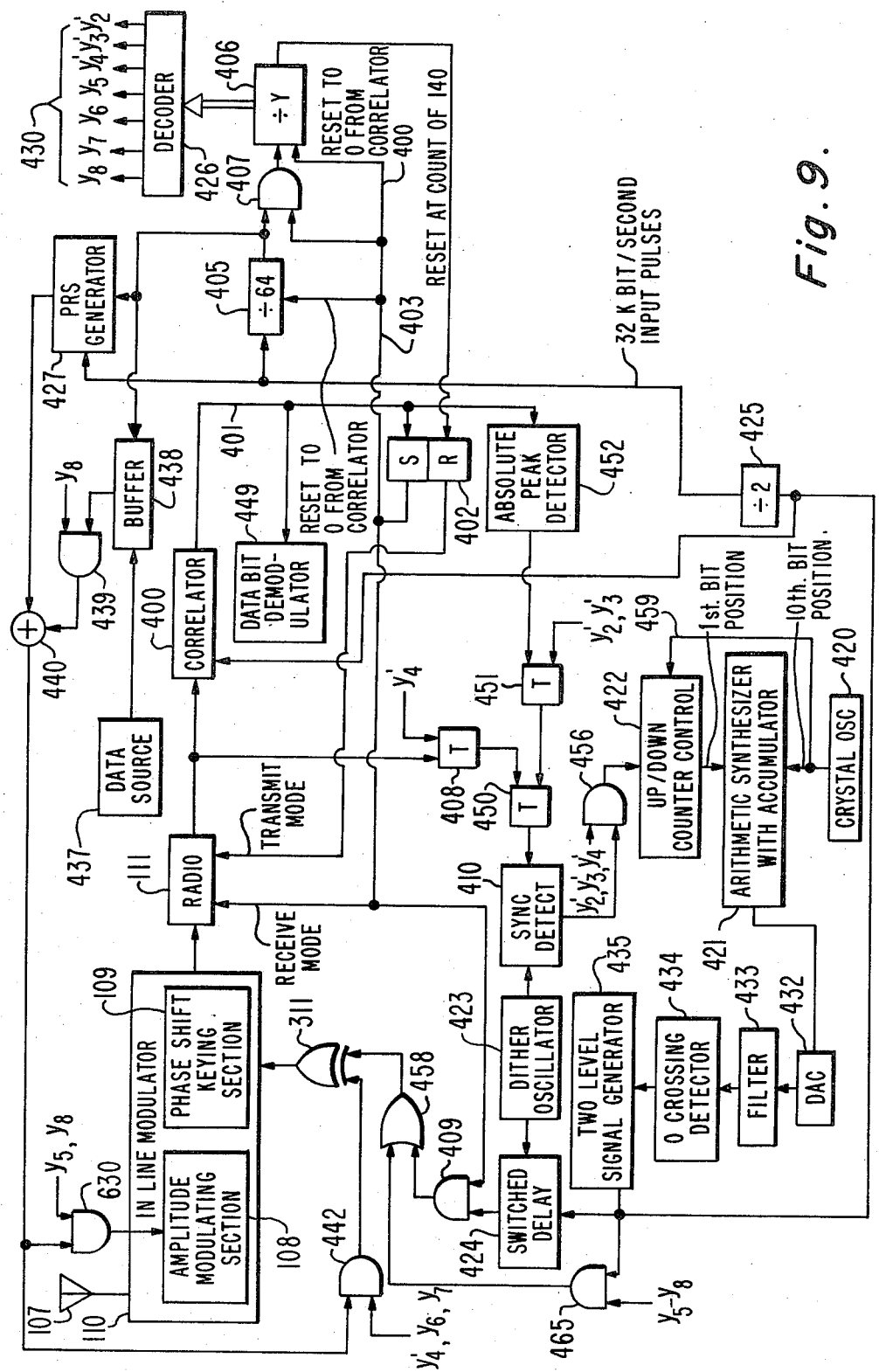
FIG. 9 is a general block diagram of the transponder logic.

It should be noted that the PRS correlators 400 and 230 of FIGS. 9 and 11 can be one of two types. In fact, both types can be employed in the invention. In one type of PRS correlator the PRS signal is generated continuously within the correlator and becomes synchronized with the iteratively occurring PRS signal component of the received signal, thus producing a constant DC voltage output. An alternative form of PRS correlator is one in which the PRS signal is stored in the correlator but does not track with the PRS component of the received signal. Thus, a pulse is generated each time the received PRS signal moves past and coincides with the stored PRS signal. The latter type correlation can perhaps be better employed during the $Y_1$ portion of the interrogation signal since it will provide a distinct pulse at each correlation which can be counted and thereby identify the end of the wake-up period $Y_1$ in the transponder. The first type of PRS correlator can perhaps be more advantageously employed during the signal portions $Y_2$–$Y_8$ to provide a continuous DC output which reaches a peak value when maximum correlation occurs between the received PRS signal and the locally generated tracking PRS signal. However, either type PRS correlator can be employed for all portions of the interrogation and responsive signals, with appropriate changes in detecting logic, as will be discussed in more detail later herein.

Assume for purposes of discussion that the type correlator in which the PRS signal is stored is employed during the signal portion $Y'_1$ and that the tracking type PRS correlator is employed during signal portions $Y'_2$–$Y'_8$.

The transponder has now been alerted by $Y_1$ (the wake-up signal portion) and knows that portions $Y_2$, $Y_3$ and $Y_4$ of the interrogation signal will follow immediately.

In response to the "wake-up" signal $Y_1$, the transponder will, by logic to be described in detail later, supply an internally generated 32 kHz tracking signal to the phase shift keying (PSK) section 109 (FIG. 9) of the in-line transponder modulator 110 in preparation for demodulation of the $Y_2$ portion of the interrogation signal which will be received next as $Y'_2$.

As shown in FIGS. 2 and 4, the $Y_2$ signal portion is composed of the RF carrier signal 3A phase shift modulated by 32 kHz signal 3B, and amplitude modulated by PRS signal 3D to produce a resultant signal 3E.

By phase lock means in the transponder, a tracking 32 kHz signal generated internally at the transponder will become phase locked with the 32 kHz component of the received signal $Y_2$, and due to phase modulation by the tracking 32 kHz signal, will remove the 32 kHz component from the received signal, outputting only the carrier signal 3A amplitude modulated by PRS signal 3D. The detector in radio 111 (FIG. 9) removes the RF carrier signal, outputting to correlator 400 only the PRS signal plus a small signal caused by a dither oscillator in the transponder phase lock loop circuit, which will be discussed later. The PRS signal in transponder correlator 400 will remain synchronized with the received PRS signal throughout the received $Y'_2$, $Y'_3$ and $Y'_4$ portions of the interrogator signal.

As indicated, the PRS sequence is iterative, i.e., it repeats itself every data bit period and is, in fact, synchronous with the data bit periods. Each PRS signal (and each data bit period) is comprised of 64 code chips, with each code chip being equal to one cycle of the 32 kHz signal 3B. The period of a data bit is therefore $64 \times (1000/32,000) = 2$ milliseconds. Thus, the $Y_2$ signal, which is 120 milliseconds in length, is equal to 60 data bit periods and contains 60 repetitions of the PRS signal 3D.

At the end of the $Y_2$ signal, the tracking 32 kHz generated in the transponder will have become phase locked with the 32 kHz component of the received interrogation signal.

Next, the $Y_3$ portion of the interrogation signal will be generated, and received at the transponder as $Y'_3$, as shown in FIG. 2. The $Y_3$ signal portion is composed of the carrier signal 3A phase shift keyed by the 32 kHz square wave signal 3B, and amplitude modulated by the PRS signal 3D multiplied (inverted) by data bit signal 3F, to produce the resultant transmitted signal 3H.

The 32 kHz signal generated in the transponder remains phase locked with the received 32 kHz signal component of the $Y'_3$ signal, since there was no change in phase in the transition of signal portion $Y_2$ to $Y_3$ (or $Y'_2$ to $Y'_3$). Thus, the 32 kHz signal in the received signal portion $Y'_3$ is removed, leaving the RF carrier signal 3A amplitude modulated by the PRS signal, with the PRS signal either being inverted by being multiplied by a binary 0 of waveform 3F between times $t_6$–$t_{11}$, resulting in that portion of PRS signal 3G shown between times $t_6$–$t_{11}$, or with the PRS being uninverted when multiplied by a binary "1", as shown in waveform 3F between times $t_1$–$t_6$, resulting in the PRS waveform 3G as shown between times $t_1$–$t_6$. The RF carrier is removed by the transponder radio detector and filter, outputting only the inverting and uninverted PRS signals and a small signal resulting from a dither oscillator, as will be discussed later.

The transponder correlator 400 and data demodulator 449 respond to the inverted and uninverted PRS signals to reproduce the two level data bit signal of waveform 3F. During the entire $Y'_3$ signal period the 32 kHz signal generated internally in the transponder remains phase locked with the received 32 kHz signal.

At the termination of the $Y_3$ portion of the interrogation signal (FIG. 2), the $Y_4$ portion thereof is generated and arrives at the transponder a time interval $\delta_1$ later as $Y'_4$, which is identical to $Y_4$, except for propagation delay and distortion. $Y_4$ consists of the RF carrier 3A phase shift keyed by the signal 3I, which, in turn, consists of the 32 kHz signal 3B multiplied by the PRS signal 3D to produce the resultant transmitted $Y_4$ signal 3J. The waveform 3J is a continuous signal as opposed to the discontinuous signals 3E and 3H, representing $Y_2$ and $Y_3$, respectively. The continuous signal 3J ($Y_4$) contains more energy than either of signals 3E or 3H, thereby enabling an even greater degree of phase synchronization between the 32 kHz generated within the transponder and the 32 kHz component of the received signal. It is during the period $Y'_4$ that fine tracking of the 32 kHz component of the interrogation signal is obtained.

There is a counter 406 (FIG. 9) in the transponder which is reset by the occurrence of correlation in correlator 400 during $Y'_1$ and then immediately again begins to count at a 500 Hz rate, which is the bit rate. Such counting is in synchronism with each initiation of a PRS sequence. Thus, counter 406 keeps track of the beginnings and ends of $Y'_1$, $Y'_2$, $Y'_3$ and $Y'_4$, each of which consists of an integral number of bit periods.

Immediately upon the termination of $Y'_3$ counter 406 will activate various gates, energize radio 111 and change the transponder from a receiver to a transmitter, which will then generate signals $Y_5-Y_8$, shown and defined in FIGS. 2 and 4, and which occupy time intervals $y_5$, $y_6$, $y_7$ and $y_8$, respectively. Each of the signal portions $Y_5-Y_8$ reach the interrogator a propagation time interval $\delta_2$ after transmission thereof and are identified at the interrogator as $Y'_5$, $Y'_6$, $Y'_7$ and $Y'_8$.

As shown in FIGS. 2 and 4, the signal portion $Y_5$ is 92 milliseconds long and consists of an RF carrier signal 3A phase shift keyed by a 32 kHz signal 3B and amplitude modulated by PRS signal 3D to produce the transmitted signal 3E.

Note that the waveforms of FIG. 3 only represent the type waveforms produced by the interrogator and the transponder. Thus, when it is said at different places in the description that both the interrogator and the transponder generate the signal 3E, it does not means that the interrogator and the transponder produce one and the same signal but rather that each, at the proper time, produces a signal having the waveform 3E.

The interrogator is prepared to receive $Y'_5$, since it had just previously transmitted an interrogation signal to the transponder. Therefore, no "wake-up" signal portion comparable to $Y_1$ is needed in the responsive signal transmitted from the transponder to the interrogator.

When $y'_5$ arrives at the interrogator (FIG. 11), it is supplied from the antenna 103 thereof to the phase shift keying section 101 of in-line modulator 105. FIG. 11 shows the interrogator in its receive mode and will be discussed in detail later herein. Also supplied to PSK section 101 is the tracking 32 kHz signal 3B generated internally in the interrogator.

By means of a phase lock loop circuit to be described later, the internally generated tracking 32 kHz signal becomes synchronized with the 32 kHz signal component of the received $Y'_5$ signal, thereby removing such received 32 kHz signal component from the $Y'_5$ signal, and outputting to radio 100 only the RF carrier signal amplitude modulated by the PRS signal. The RF carrier signal is removed by the detector of radio 100, outputting only the PRS sequence, plus a small voltage due to a dither oscillator, to correlator 230 which becomes and remains synchronized with the locally generated PRS signals.

Signal $Y'_6$ is received next by the interrogator and is composed of an RF carrier signal 3A phase shift keyed by a signal 3I, which consists of the 32 kHz signal 3B multiplied by PRS signal 3D. As indicated in FIG. 4, $Y_6$ and $Y'_6$ have a waveform 3J. The 32 kHz tone and the PRS signal generated locally in the interrogator remove the 32 kHz component and the PRS component of the received signal, and the radio 100 removes the RF carrier.

Next, $Y'_7$ is received from the transponder at the interrogator and is composed, as was $Y'_6$, of an RF carrier signal phase shift keyed by the product of a 32 kHz signal 3B and the PRS signal 3D to produce the resultant transmitted signal 3J. Both the 32 kHz component and the PRS component of $Y'_7$ are removed by being phase locked with, and phase shifted by, the locally generated 32 kHz and PRS signals. The RF carrier is removed by the radio 100 detector outputting only a small voltage due to the effect of dither oscillator 602.

Next, the final segment, $Y_8$, of the transponder generated signal is received at the interrogator as $Y'_8$. Signal portion $Y'_8$ consists of an RF signal phase shift keyed by the 32 kHz signal 3B and amplitude modulated by signal 3G, which carrier data information. Specifically, waveform 3G consists of the PRS signal 3D multiplied by a data sequence 3F which results in an inversion of the PRS signal 3D when the bit is a "0" and no inversion when the data bit is a "1."

The 32 kHz component of the received $Y'_8$ signal is removed by the synchronous locally generated 32 kHz signal and the RF carrier is removed by the radio detector, outputting the data carrying PRS signal 3G to the interrogator correlator 230 which then supplies a two-level, data-representing signal to data demodulator 241 through AND gate 240, which is enabled only during the presence of timing signal $y'_8$.

Precise phase lock occurs between the 32 kHz component of the received signal and the locally generated 32 kHz signal during signal portion $Y'_7$. Signal portion $Y'_7$ is 20 milliseconds in length which is equal to ten data bit periods, with each data bit period defining the beginning and end of a PRS sequence. Each data bit period at the interrogator and also at the transponder are defined by counters which count 64 cycles of the 32 kHz signals with the count beginning in the transponder counter at the end of the "wake-up" correlation signal $Y_1$.

As mentioned above, the round-trip propagation time of the signals is $\delta_1+\delta_2$, which is less than a data bit period. Thus, the phase displacement of the bit period as received at the interrogator with respect to a bit period originally generated at the interrogator is equal to the time interval $(\delta_1+\delta_2)$. Accordingly, $(\delta_1+\delta_2)c$ is equal to the round-trip propagation distance between the interrogator and the transponder.

Figure 5:
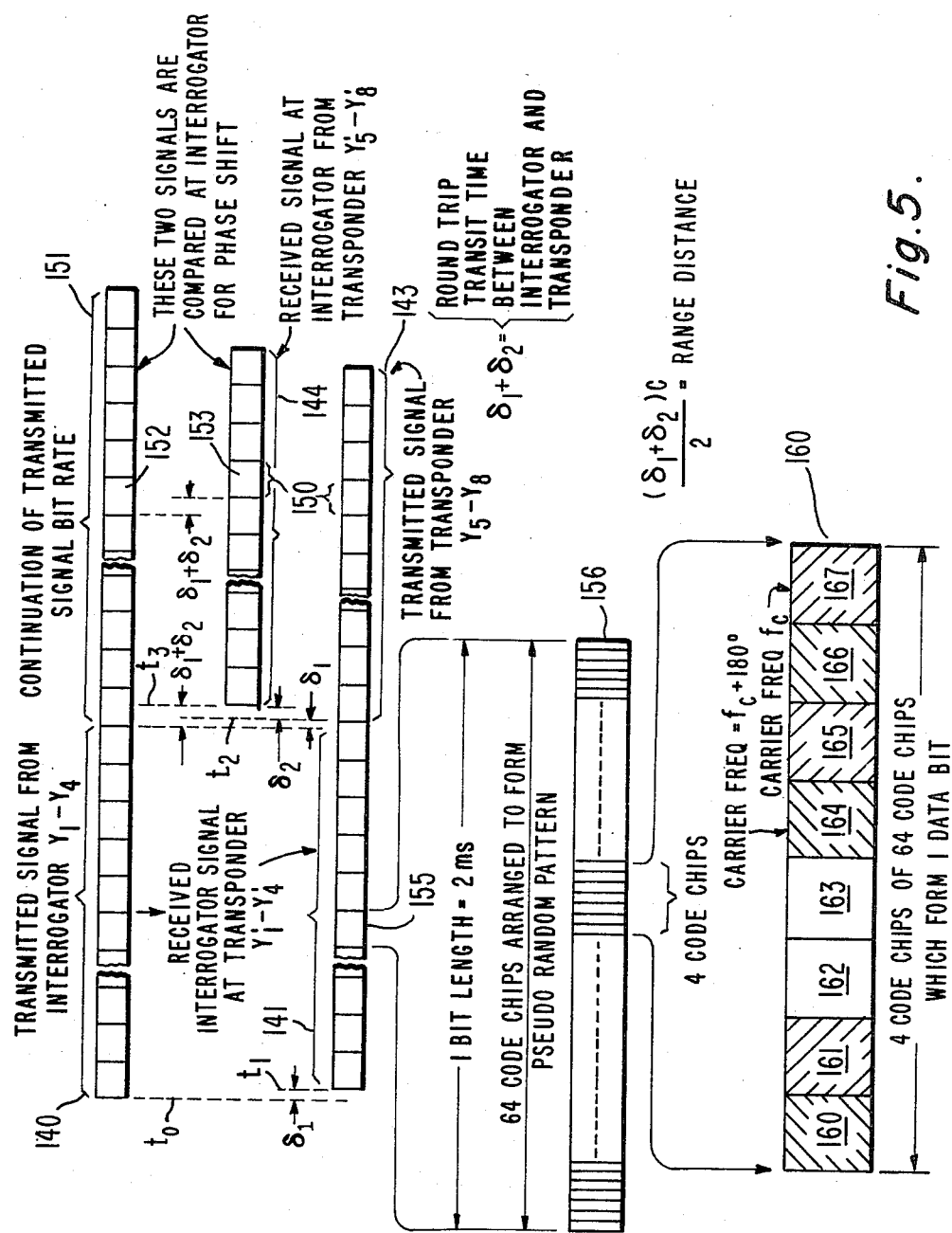
FIG. 5 is another timing diagram showing the phase relationship between the data bit period of the original interrogation signal and the data bit period of the responsive signal as received at the interrogator, and also shows the composition of a data bit.

In FIG. 5 the entire interrogator signal 140 is shown as originating at time $t_0$ and being received at the transponder as signal 141 at time $t_1$, delayed by a time interval $\delta_1$.

At time $t_2$, immediately upon the termination of the received interrogation signal 141, the transponder generates its response signal 143, which is received by the interrogator as signal 144, delayed by a time interval $\delta_2$.

However, all during the transmission of the response signal from the transponder, the interrogator continues to generate bit rate signals, as shown by waveform 151, and which are time synchronous with the bit rate of the originally generated interrogation signal 140.

The phase displacement between the original generated bits at the interrogator and those bits received at the interrogator from the transponder can be seen by comparing the data bit periods 152 and 153 in signals 151 and 144 of FIG. 5. Received data bit 153 (from the transponder) can be seen to lag originally transmitted data bit by a time interval $(\delta_1+\delta_2)$.

The waveform 156 of FIG. 5 is an expanded view of the individual code chips of a single bit 155 from received interrogation signal 141.

Waveform 160 shows an expanded view of eight half code chips of the waveform 156. The eight half code chips of waveform 160 of FIG. 5 were arbitrarily selected to be the same as the first eight half code chips of FIG. 3H. Each half code chip is equal to ½ cycle of the 32 kHz signal 3B, with the phase of the RF carrier being alternately reversed, and with half code chips 162 and 163 consisting of no transmitted signal. As mentioned briefly above, the comparing of the phase shift of the two bit periods 152 and 153 is effected with the logic of FIG. 11, which is a part of the interrogator and which is described generally below and in detail later herein.

However, before discussing FIG. 11 a brief discussion of the arithmetic frequency synthesizer 605 of FIG. 11 will be set forth. An arithmetic synthesizer also appears in FIG. 9. Arithmetic frequency synthesizers are means for digitally producing signals of desired frequencies. Basically they comprise a frequency control means usually in the form of an up/down counter which supplies a given incremental value to an accumulator under control of a clock signal. The accumulator accumulates the received increments until the capacity of the accumulator is reached at which time it overflows and returns to a near zero value depending upon the amount of overflow occurring when the last increment was added thereto. The contents of the accumulator, after each increment is added thereto, represents an amplitude in the form of a digitized word. Such digitized words are supplied to signal processing means including at least a digital-to-analog converter and which ultimately produces an output signal (in the present application a two-level output signal) whose frequency is equal to the overflow rate of the accumulator. The frequency of such output signal can be changed by altering either the incremental value supplied to the accumulator from the up/down frequency control counter or the clock rate at which the incremental value is added to the accumulator, both which will change the time required to cause the accumulator to overflow. A detailed block diagram of an arithmetic synthesizer is not shown in either FIG. 9 or FIG. 11 since such structures are well known in the art. For a detailed discussion of an arithmetic synthesizer reference is made to co-pending application Ser. No. 937,834, now U.S. Pat. No. 4,206,425 filed Aug. 29, 1978 by Edward J. Nossen, entitled, "Frequency Synthesizer" and assigned to the same assignee as the present invention.

Turning to a general description of FIG. 11 the original interrogation signal was generated, in part, by the circuits in the counting chain within dotted block 331, (FIG. 11), comprised of oscillator 200, divide-by-64 divider 201, divide-by-2 divider 204, and divide-by-54 divider 206. As indicated above the counting chan 331 continued to count after the interrogation signal had been transmitted with the output signals thereof, including the bit rate, remaining time synchronous with the signal components of the interrogation signal and with the instantaneous counts in the dividers 201, 204 and 206 being supplied to binary subtractor 600 at the proper time during Y'$_7$.

The Y'$_7$ signal, which includes the phase of the data bit periods, is received from the transponder via antenna 103 and passes through in-line modulator 105, radio 100 and then to correlator 230. The divide-by-2 divider 610 and the divide-by-64 divider 611 were reset to zero at the beginning of a bit period when correlation of the received and locally generated PRS signal occurred during the early part of the received signal portion Y'$_5$. The two-level 32 kHz signal outputted from generator 620 (which signal is derived from arithmetic synthesizer 605 as will be discussed later) has also been phase locked with the 32 kHz component of the received signal. Thus, counting chain 615 is counting bit periods in phase lock synchronism with the bit periods of the received signal. The contents of the arithmetic synthesizer 605, the divide-by-2 divider 610 and the divide-by-64 divider 611 are strobed and compared with the contents of counting chain 331 at some selected count of divider 201, which count occurs during the Y'$_7$ signal. The difference between the two counting chains is a direct measure of the round-trip distance between the interrogator and the transponder.

As a specific example, assume that the oscillator 200 output frequency $f_0 = 2.048$ MHz and that the divider 201 and the arithmetic synthesizer 605 each divide by 64 to produce output signals of 32 kHz. The divide-by-2 dividers 204 and 610 produce an output signal of 32 K bits per second and the divide-by-64 dividers 206 and 611 produce an output of 500 bits per second.

If the arithmetic synthesizer 605 has a 15-bit position accumulator, and a pulse is added into the lowest order bit position of the up/down frequency control counter, the accumulator phase will be shift-response to each pulse of the 2.048 MHz signal. Multiplying the $2^{15}$ count of the arithmetic synthesizer by the $2^7$ count of divider 64 results in a time division of the 2 millisecond bit period into $2^{22}$ parts. Since a signal will propagation about 374 miles in 2 milliseconds, the distance between the interrogator and the transponder can be calculated to less than a foot.

Relative velocity can be approximated from the changes in the differences of the counting chains based on periodically transmitted signals. Acceleration can be determined by taking the rate of change of count difference taken at periodic intervals.

The nature of the interrogation signal and the responsive signal from the transponder have now been discussed in some detail. Next, the frequency spectrum compatibility of the interrogation and the responsive signals with the radios 100 and 111 of the interrogator and the transponder will be discussed.

Figure 6:
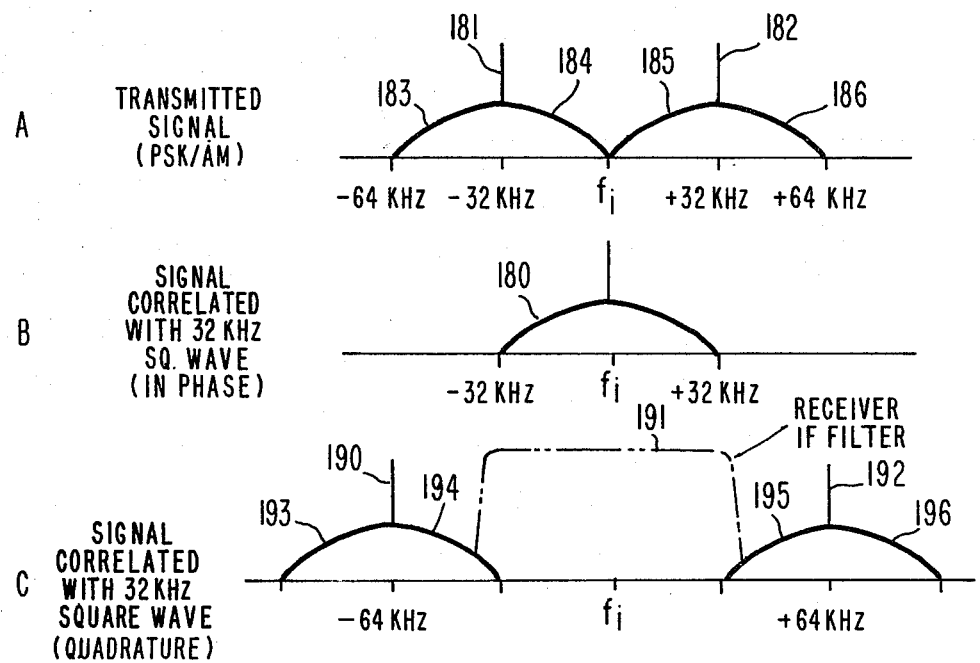
FIG. 6 is a set of time domain frequency diagrams illustrating the relationship of the interrogation and responsive signals with the intermediate frequency pass band of the interrogator and transponder radios when the 32 kHz components of such signals are in phase or in quadrature phase with the locally generated 32 kHz tracking signals.

FIG. 6C shows an IF filter frequency response characteristic curve 191 with $f_i$ indicating the nominal center frequency of the pass band. When an interrogation signal consisting of an RF carrier signal, phase shift keyed with a 32 kHz signal 3B and amplitude modulated with a PRS signal 3D, is received by a radio (after the RF carrier frequency has been reduced to the IF frequency with a nominal center frequency $f_i$), the frequency spectrum will be substantially as shown in FIG. 6A with the upper and lower sidebands caused by the 32 kHz signal being represented by reference characters 181 and 182. The four portions 183, 184, 185 and 186 have a (sin x/x) envelope and represent the sidebands caused the amplitude modulation of the RF carrier by the PRS signal 3D which changes states irregularly but always at the beginning of a cycle of 32 kHz signal 3A.

It will be recalled that the transponder was alerted by the Y'$_1$ "wake-up" portion of the interrogation signal. Thus, when Y'$_2$ is received the transponder control means will have supplied its locally generated 32 kHz signal to the in-line modulator 100. However, before synchronization with the received 32 kHz signal component occurs, the locally generated 32 kHz signal can be as much as 90° or more out of phase therewith, thereby doubling the 32 kHz frequencies to produce a signal having upper and lower sidebands of ±64 kHz. Such sidebands are shown in FIG. 6C at the nominal center sideband frequencies 190 and 192. The sideband portions 193, 194, 195 and 196 represent frequency components due primarily to the PRS signal and have an envelope substantially equal to (sin x/x), as mentioned above in connection with FIG. 6A.

After correlation occurs between the 32 kHz signal generated in the transponder and the 32 kHz component of the received signal, the 32 kHz component is removed from the received signal 3F, leaving only the RF carrier 3A amplitude modulated by the PRS signal 3D, which occupies the frequency spectrum shown in FIG. 6B, with the nominal IF center frequency being $f_i$, the RF carrier of the received signal having been reduced to the IF frequency by the local oscillator of the transponder radio.

The signal shown in FIG. 6B will pass through the IF filter in the radio 111 of FIG. 9, with the IF signal component being removed and only the PRS being passed on to the correlator 400.

The various frequency spectrum curves of FIGS. 6A, B and C are equally applicable to the interrogator during the reception of a response signal from the transponder.

The nature of the interrogation and response signals and the frequency spectrum compatibility of such signals with the radio filters have now been discussed. Next, the logic employed in a preferred embodiment of the invention to generate and track the interrogation and response signals will be discussed.

Referring again to FIG. 1, the in-line modulators 105 and 110 are each divided into a phase shift keyed modulator (101 and 109) and an amplitude modulator (102 and 108), all of which can be of conventional design and are under control of the ranging processors 104 and 112. The ranging processors 104 and 112 also interact with the radios 100 and 111, respectively, to either make them into receivers or transmitters in accordance with whether a code signal is being received or transmitted. Further, the ranging processors 104 and 112 function generally, in cooperation with their respective in-line modulators 105 and 110, to perform the following major functions.

1-The interrogation ranging processor 104 controls the generation of the interrogation signal.
2-The transponder ranging processor 112 controls the demodulation and tracking of the received interrogation signal.
3-The transponder ranging processor 112 controls the generation of the response signal.
4-The interrogation ranging processor 104 controls the demodulation and tracking of the response signal received from the transponder.
5-The interrogation ranging processor 104 determines the propagation time of the signals and thereby the distance between the interrogator and the transponder.

Figure 7:
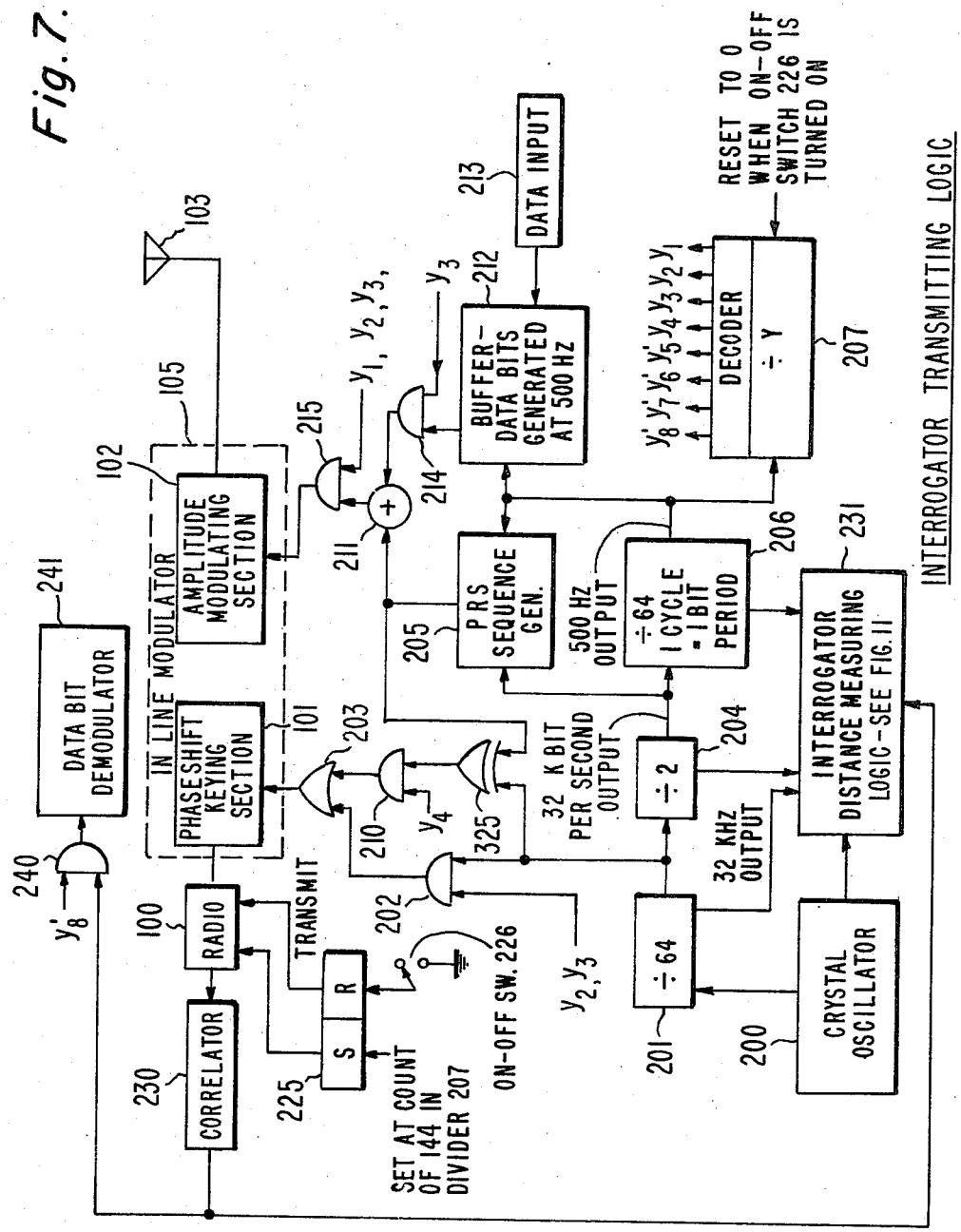
FIG. 7 is a block diagram of that portion of the interrogator transmitting logic which includes the logic means for modulating the interrogation signal through its three main portions.

Consider first the interrogation ranging processor 104 which is shown generally in block diagram in FIG. 7 along with the radio 100, the in-line modulator 105 and the correlator 230.

A crystal oscillator 200 provides the basic timing for the system and can have a frequency of 2.048 MHz which is divided by 64 in divider 201 to produce a 32 kHz signal 3B. The 32 kHz signal is supplied through AND gate 202 and OR gate 203 to the PSK section 101 during time period defining signals $y_2$ and $y_3$ only when AND gate 202 is enabled. As will be recalled from FIGS. 2 and 4, signal portions $Y_2$ and $Y_3$ occur during the interrogation periods $y_2$ and $y_3$, respectively. The 32 kHz output signal 3B from divider 201 is then divided by pulse generator 204 to produce the 32 k bit pulses of FIG. 3C, which are supplied to PRS generator 205 and to divider 206. The PRS generator 205 responds to the 32 K bit signal 3C to generate PRS signal 3D. The divide-by-64 divider 206 responds to the 32 K signal to output a 500 Hz output signal (the data bit rate of the system) which is supplied to the divide-by-Y divider The divider 207 is a basic timing device of the system and determines the duration of each of the Y portions of the interrogation and responsive signals. Specifically, the divider 207 counts the number of data bits and energizes its timing outputs $y_1$–$y_4$ and $y'_5$–$y'_8$ between selected bit counts. The length of time that each of the y outputs of divider 207 are energized, determines the time duration of the Y portions of the interrogation and responsive signals. For example, the $y_1$ timing signal output of divider 207 in FIG. 8 will be energized for a period of 8 ms, or four bit periods during the count of 0-4 of divider 207. Thus, the $Y_1$ portion of the interrogation signal will also be 8 ms in length, or four bit periods. As another example, the timing signal $y_2$ of divider 207 will be energized for a period of 120 ms, or sixty data bit periods, between the counts 5 and 64 of divider 207. Thus, the $Y_2$ portion of the interrogation signal will be time coincident with the occurrence of the $y_2$ timing signal output of divider 207 and accordingly, will have a duration of 120 ms or sixty data bit periods.

Figure 8:
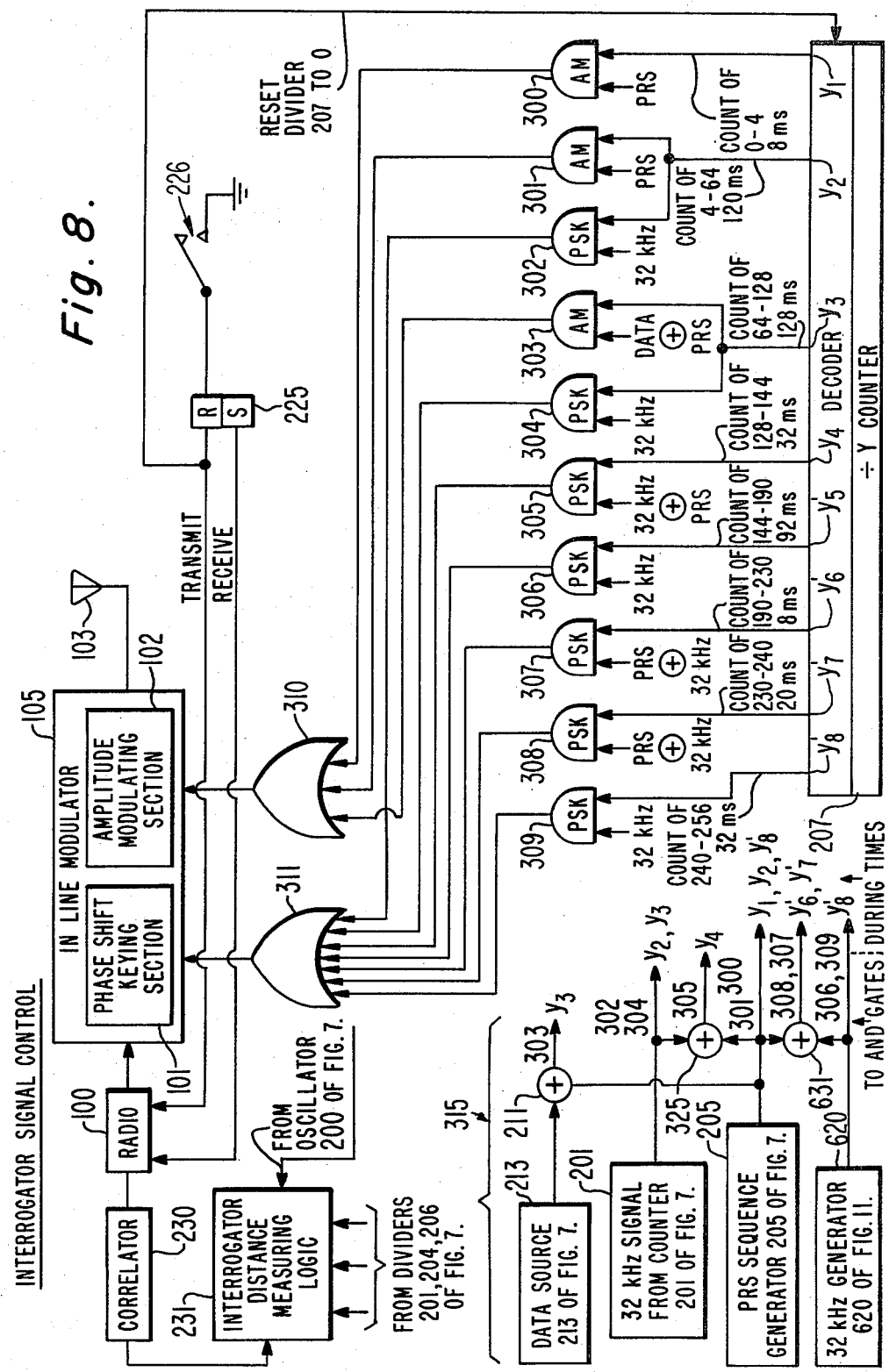
FIG. 8 is a combination of logic and block diagrams of the interrogator and is similar to FIG. 7 except that the timing portion of the structure and the gating circuits controlled thereby are shown in more detail than in FIG. 7.

FIG. 8 shows the details of the divide-by-Y divider 207 and the logic including AND and OR gates which function to supply the proper signals, such as the 32 kHz transmitting tone from block 201, the 32 kHz tracking tone from block 620, the PRS either by itself (block 205) or Exclusive-ORed with either the 32 kHz transmitting or tracking tones, (Exclusive-OR gates 325 or 631) or data encoded on the PRS signal, to the PSK or AM portions of the in-line modulator 105 at the proper time intervals $y_1$–$y_4$ and $y'_5$–$y'_8$.

Consider again the generation of the $Y_1$ signal. Specifically, the $y_1$ timing signal from divider 207 of FIG. 8 energizes AND gate 300 and passes a signal (the PRS signal 3D) therethrough and then through OR gate 310 to the AM section 102 of in-line modulator 105 to amplitude modulate the RF carrier of radio 100 with the PRS signal 3D during the time interval $y_1$.

All of the component signals passing through AND gates 300–309 of FIG. 8 are generated by the interrogator logic represented generally under the bracket 315 which comprises only a part of the more complete logic shown in FIG. 7. The individual blocks 213, 201, 205 and 620 represent signal sources. The Exclusive-OR gates show how these signals are combined. The output terminals of the individual blocks indicate to which of the AND gates of FIG. 8 the signals are to be supplied and during which time periods. However, the detailed discussion of how these component signals are generated will be set forth later herein in connection with more description of FIG. 7.

Referring again to FIG. 8, the $Y_2$ signal is generated during time $y_2$ by the PRS signal 3D passing through AND gate 301 and OR gate 310 to amplitude modulate the RF carrier of radio 100 in AM section 102. The 32 kHz signal is simultaneously passed through AND gate 302 and OR gate 311 to phase modulate (PSK) the RF carrier of radio 100, with the resulting signal waveform 3E (FIG. 3) being transmitted as interrogation signal portion $Y_2$ to the transponder, where it is received as $Y'_2$.

Consider next the generation of $Y_3$, defined in the chart of FIG. 4. It can be seen that $Y_3$ consists of phase shift modulation (PSK) of the RF carrier by the 32 kHz signal, and amplitude modulation thereof by the PRS signal 3D Exclusive-ORed with the data to produce the resultant waveform 3H of FIG. 3. More specifically, in FIG. 8, the 32 kHz signal is supplied to one terminal of AND gate 304 and $Y_3$ is supplied from divider 207 to the other input terminal thereof, so that AND gate 304 is enabled during the entire time period $y_3$. The 32 kHz signal passes through AND gate 304 and then through OR gate 311 to phase shift modulate the RF carrier of radio 100 in PSK section 101. Simultaneously, during time period $y_3$, the PRS signal 3D multiplied by the data information of waveform 3F passes through AND gate 303, primed by the $y_3$ signal, and then through OR gate 310 to amplitude modulate the RF carrier in AM section 102. The $Y_3$ signal is received at the transponder as $Y'_3$ discussed in connection with FIG. 2.

Consider now the signal portion $Y_4$, the components of which are shown in the chart of FIG. 4. It can be seen that $Y_4$ consists of the RF carrier from radio 100 phase shift keyed by a signal comprised of the 32 kHz signal 3B Exclusive-ORed with the PRS signal 3D, and resulting in the transmitted waveform 3J.

The PRS signal 3D Exclusive-ORed with the 32 kHz signal 3B is supplied to one input of AND gate 305 which is enabled during 32 millisecond time period $y_4$ when counter 207 is counting from a count of 128 to a count of 144. The Exclusive-ORed output signal of AND gate 305 is then supplied through OR gate 311 to the PSK section 101 of modulator 105 to phase shift modulate the RF carrier and thereby produce the continuous waveform 3J.

AND gates 306, 307, 308 and 309 of FIG. 8 are employed in the generation of local signals employed to detect and track the responsive signal received from the transponder, and will be discussed later herein.

Reference is again made to FIG. 7 to discuss further the generation and means for combining the various signal components which make up the four signal portions $Y_1$–$Y_4$. As described above, the 32 kHz waveform 3B is the output of divider 201. This 32 kHz signal is supplied through AND gate 202, when such AND gate is primed during time periods $y_2$ and $y_3$ and then through OR gate 203 to the PSK section 101 of in-line modulator 105. Note that AND gate 202 collectively represents the AND gates 302 and 304 of FIG. 8 since AND gate 202 is primed during the $y_2$ and $y_3$ time periods generated by divider 207 of FIG. 8.

Similarly, OR gate 203 of FIG. 7 corresponds to the OR gate 311 of FIG. 8 in that the various signals that pass through OR gate 203 are the same signals passing through OR gate 311 of FIG. 8. Specifically, in addition to the various signals passing through AND gate 202, another signal is passing through AND gate 210 to OR gate 203 during the time period $y_4$. The output of PRS generator is Exclusive-ORed with the 32 kHz output signal from divider 201 in Exclusive-OR gate 325, the output of which is passed through AND gate 210 to OR gate 203 and PSK section 101 during time period $y_4$ only when AND gate 210 is primed.

The 500 Hz clock output from divider 206 is supplied to PRS generator 205 along with the 32 kilo bit per second signal from pulse generator 204. The PRS generator responds to the 500 Hz and 32 K bit per second signals to iteratively generate the PRS waveform 3D every bit period.

The output of PRS generator 205 is supplied to Exclusive-OR gate 211 along with the output of data buffer 212 which receives data from data source 213. The buffered data is supplied through AND gate 214 only during the time period represented by signal $y_3$, which primes AND gate 214. Thus, during time period $y_3$, data is encoded upon the transmitted signal in AM section 102 after being Exclusive-ORed with the PRS output of PRS generator 205 in Exclusive-OR circuit 211 and then supplied through AND gate 215, which is also primed during time period $y_3$. It is to be noted that data is encoded on the transmitted signal only during time period $y_3$ since $y_3$ is the only time period AND gate 214 is primed. During the time periods $y_1$ and $y_2$ only the PRS signal is supplied to the AM section 102 of in-line modulator 105.

The system is energized initially to transmit the encoded interrogation signal by the momentary closure of on/off switch 226 which resets flip-flop 225 and energizes radio 100 to produce an RF carrier frequency therein and also to reset divider 207 to zero. Switch 226 can be an electronic switch, such as a one-shot multivibrator, for example. Once flip-flop 226 is reset, generation of the interrogation signal begins immediately. The divider 207 commences counting bit periods through the divider chain including crystal oscillator 200, divider 201, pulse generator 204 and divider 206 and controls the logic of FIGS. 7 and 8 to generate the four portions $Y_1$–$Y_4$ of the interrogation signal.

Referring now to FIG. 9, the basic logic of the transponder employed for synchronization and tracking of the interrogation signal received from the interrogator will be discussed. When the $Y_1$ portion of the interrogation signal is received at the transponder of FIG. 9 as signal $Y'_1$, such transponder way, at that time, be receiving a signal from some other source or transmitting a signal. However, the $Y_1$ portion of the interrogation signal is an RF carrier signal, amplitude modulated by the PRS signal, and will be received by the transponder in that it passes freely through the in-line modulator 110 and the filter stages of radio 111 without interference, and then into the correlator 400, which contains a stored PRS signal corresponding to the PRS component of the received $Y'_1$ signal. When the received and stored PRS signals coincide, there is an output from correlator 400 on lead 401 which sets flip-flop 402. The setting of flip-flop 402 energizes the bus 403 which performs several functions. These functions are the resetting of dividers 405 and 406 and the priming of AND gates 407 and 409.

In FIG. 9 the priming of AND gate 409 permits a locally generated tracking 32 kHz square wave signal 3B to be supplied to the PSK section 109 of in-line modulator 110 through OR gate 458 and Exclusive-OR gate 311 to demodulate the remaining portions of the incoming interrogation signal. Specifically, the tracking 32 kHz signal generated within the transponder during the reception of the $Y'_2$, $Y'_3$ and $Y'_4$ portions of the interrogation signal is phase shifted by the transponder logic until such tracking 32 kHz signal becomes phase locked with the 32 kHz components of the received $Y'_2$, $Y'_3$ and $Y'_4$ portions of the interrogation signal, thereby removing such 32 kHz components from the received interrogation signal and passing, during portions $Y'_2$ and $Y'_3$ only the carrier amplitude modulated by the PRS to radio 111. During portion $Y'_4$ the local PRS, Exclusive-ORed with tracking 32 kHz signal, removes the received Exclusive-ORed PRS and 32 kHz signal components, passing only the carrier to radio 111. Radio 111 removes the carrier, and during periods $y'_2$ and $y'_3$, outputs the PRS and a voltage due to dither oscillator 416 employed in the generation of the local tracking 32 kHz signal.

The means by which the 32 kHz signal is generated locally within the transponder is as follows. The crystal oscillator 420 of FIG. 9 supplies a 2.048 MHz signal to the 15-bit accumulator of arithmetic synthesizer 421, where a binary one has been stored in the tenth bit position of the up/down frequency control counter of the arithmetic synthesizer, thereby causing the upper six bit positions of the accumulator to divide by 64. Thus, the accumulator output supplied to digital-to-analog converter (DAC) 432 is a 32 kHz signal. The DAC 432 is constructed to produce a stepped 32 kHz sine wave which is filtered by filter 433 to become a nearly pure sine wave. Zero crossing detector 434 and two-level signal generator 435 respond to the filtered sine wave to produce a 32 kHz two-level signal which is supplied to switched delay means 424. Switched delay means 424 switches the 32 kHz two-level signal to an early/late condition under the control of dither oscilator 423. The dithered 32 kHz signal is then supplied through AND gate 409, OR gate 458 and Exclusive-OR gate 311 to the PSK section 109 of in-line modulator 110 where it phase shift modulates the 32 kHz component of the received interrogation signal. However, the two 32 kHz signals are not, at first, in a phase locked condition.

When not in phase lock, the two 32 kHz signals will tend to produce a frequency spectrum as shown in FIG. 6C with respect to the intermediate frequency filter pass bans of the radio 111 in FIG. 9.

The dither oscillator 423 supplies a two-level signal both to switched delay means 424 and also to synchronous detector 410. The switched delay means responds thereto to switch the two-level 32 kHz output from generator 435 alternately between an early/late state with respect to the 32 kHz component of the received signal. When out of phase, either the early state or the late state will accentuate the out-of-phase condition and produce a lower output signal from the PSK section 109 than will be produced by the other state. This output signal is supplied through radio 111 and correlator 400 to synchronous detector 410. The level of the dither oscillator output signal will inform the synchronous detector 410 whether pulses should be added to, or deleted from, the AS up/down frequency control counter by means of up/down counter control 422, but only during times $y'_2$–$y'_4$ when AND gate 456 is primed to bring the output of the AS accumulator into phase lock with the 32 kHz component of the received interrogation signal. When the early/late states of the 32 kHz output signal from generator 435 produce equal output voltages from PSK section 109, phase lock has been acquired.

However, as mentioned above, at the beginning of $Y'_2$, a phase locked condition will not exist. The output of the correlator 400 will be low due to the out-of-phase relationship between the two 32 kHz signals at the beginning of the time period $y'_2$. This low output voltage from correlator 400 will pass through peak detector 452 and transmission gate 450 to synchronous detector 410. The output of synchronous detector 410 controls up/down counter control 422 through AND gate 456 to add or subtract pulses into or from the first (the lowest) bit position of the frequency control counter of AS 421 and thence to the incremental value supplied to the accumulator of AS 421. In this manner the increments of phase shift of the AS 421 accumulator can be made quite small. Specifically, the phase of the output of the AS accumulator 421 will shift as little as $\frac{1}{2^{15}} \times 360°$ with each pulse supplied to the accumulator. The quantity $2^{15}$ is equal to 32,768.

Thus, in FIG. 9, a single pulse supplied to the first bit position of the accumulator of AS 421 will result in a phase shift of 0.011° thereof. It will require 32,768 clock pulses to shift the phase of the arithmetic synthesizer by 360°. The change of phase of the output of AS 421 is, of course, reflected in a similar change in phase in the two-level signal output from generator 435.

As the phase of the locally generated two-level 32 kHz signal from generator 435 approaches the phase of the 32 kHz component of the received interrogation signal, such 32 kHz component is removed therefrom in an increasing amount so that the output of radio 111 is the RF carrier signal amplitude modulated by the PRS signal without the 32 kHz signal component. The output of correlator 400 will increase towards a maximum and be supplied through peak detector 452 and transmission gates 451 and 450 to synchronous detector 410. When phase lock between the two 32 kHz signals is achieved, the output from synchronous detector 410 will cause up/down counter control 422 to cease supplying pulses from crystal oscillator 420 to the first bit position of the up/down frequency control counter of AS 421, except for an occasional count to maintain the phase locked condition.

The foregoing discussion relates to the function of the logic of FIG. 9 during the reception of the signal portions $Y'_2$ and also $Y'_3$, each of which consists of a carrier signal amplitude modulated by a PRS sequence and phase shift modulated by a 32 kHz signal. The signal portion $Y'_3$ also contains data which is demodulated by data demodulator 449 at the output of correlator 400.

However, during time period $y'_4$ the received waveform 3J is continuous since it is phase shift modulated by the product of the PRS signal and the 32 kHz tone. During time period $y'_4$ the output of PRS generator 427 is supplied through Exclusive-OR gate 440, primed AND gate 442 and is then Exclusive-ORed in Exclusive-OR gate 311 with the dithered 32 kHz tone which is supplied from switched delay means 424 through AND gate 409, OR gate 458 to Exclusive-OR gate 311.

The output from Exclusive-OR gate 311 is supplied to the PSK section 109 of in-line modulator 110. Since phase lock has occurred, both the 32 kHz component and the PRS component of the received interrogation signal will be removed by the internally generated signal which also consists of an Exclusive-ORed PRS sequence and a 32 kHz tone signal.

Since there is no amplitude modulation during the time period $y'_4$, the output of radio 111 can be employed as an indication of the degree of phase lock. Since very good phase lock has already been attained, both the PRS sequence and the 32 kHz components of the received interrogation signal are removed in PSK section 109. The radio 111 removes the carrier signal leaving only the voltage created by the effect of dither oscillator 423 which will reduce to a constant DC signal when phase lock is very precise. The output of radio 111 can be supplied directly through transmission gates 408 and 450 to synchronous detector 410.

It is to be noted that the locally generated 32 kHz signal from generator 435 is supplied through switched delay means 424, AND gate 409, OR gate 458 and Exclusive-OR gate 311 to PSK section 109 at times $y'_2$, $y'_3$ and $y'_4$ during the interrogation signal. During time periods $y_5-y_8$ the 32 kHz signal is supplied directly from generator 435 through AND gate 465, OR gate 458 and Exclusive-OR gate 311 to PSK section 109.

In addition to being supplied to PSK section 109, the two-level 32 kHz tone from generator 435 is also supplied to other portions of the circuit to perform different functions.

Specifically, such two-level signal from generator 435 is supplied through divide-by-2 divider 425 to divide-by-64 divider 405 and PRS generator 427.

The output of PRS generator 427 is employed during portion $Y'_8$ of the interrogation signal and during portions $Y_6$ and $Y_7$ of the responsive signal. The signal output from divide-by-64 divider 405 is employed during signal $Y'_2-Y'_4$ and $Y_5-Y_8$ portions of the interrogation and the responsive signals. The output of divider 405 is a 500 bit per second signal which defines the data bit rate of the system as well as the iterative rate of the PRS signal generated in PRS generator 427, which is in synchronism with the bit rate. The 500 bit per second output from divider 405 is supplied through primed AND gate 407 to divider 406 which counts the bit periods and establishes the basic signal timing for the transponder logic in much the same manner as does divider 207 for the interrogation logic. Divider 406 will be discussed in more detail below.

As stated above the divider (counter) 406 begins to count when correlation with the received $Y'_1$ portion of the interrogation signal has occurred in correlator 400, and flip-flop 402 has been set. At this same time dividers 405 and 406 are reset to zero and AND gate 407 is primed by the set output of flip-flop 402.

A decoder 426 having seven outputs 430 designated $y'_2-y'_4$ and $y_5-y_8$ responds to the output of divider 406 to produce an output $y'_2$ for a duration of 120 milliseconds during its count from zero to 60, which coincides in time with the received $Y'_2$ signal.

As the divider 406 continues to count at the 500 bit per second rate, it generates a timing signal on its output $y'_3$ during its count from 61 to 124 which defines a time period of 128 milliseconds and which coincides with the reception of the $Y'_3$ portion of the interrogation signal.

Reference is now made to FIG. 10 which shows an expanded view of divider 406 with its seven outputs $y'_2-y'_4$ and $y_5-y_8$, and the logic associated therewith, and further shows how such logic combines and directs various waveforms of those shown in FIG. 3 to the PSK modulator 109 and the amplitude modulator 108 during the proper time periods represented by the signals $y'_2-y'_4$ and $y_5-y_8$.

It is to be noted that the logic of FIG. 10 is not the same as shown in FIG. 9 but is the substantial equivalent thereof. The primary purpose of FIG. 10 is to clarify the manner in which the various signal portions $Y'_2-Y'_4$ and $Y_5-Y_8$ are generated. In some instances, to accomplish this purpose extra logic elements have been employed where one would be sufficient.

For example, the AND gates 505 and 506 both function to pass only the locally generated 32 kHz tracking signal to PSK section 109 through OR gate 435, but during different time periods. Obviously, one AND gate could be substituted for the two AND gates 505 and 506. As another example, AND gates 509 and 513 both pass the transmitted 32 kHz signal to PSK section 109 through OR gate 435. Obviously, one AND gate could be employed in lieu of two.

Similarly, AND gates 510 and 511 could be combined since they both pass the same signal (32 kHz $\oplus$ PRS) through OR gate 435 to PSK section 109.

In fact, the AND gates 442, 465 and 409, the Exclusive-OR gate 311 and the OR gate 458 of FIG. 9, are all that are actually required to perform the functions of the seven AND gates 505, 506, 507, 509, 510, 511 and 513 of FIG. 10.

The remaining two AND gates 508 and 512 of FIG. 10 produce the same output signals as are produced by AND gates 630 and 439 of FIG. 9 in cooperation with Exclusive-OR gate 440.

Further, in FIG. 10, the detailed generating logic of FIG. 9 is not shown. The sources of the various signals to be supplied to the in-line modulator 110 are represented generally by blocks 500, 501, 502, 503, 504 and 499 with the waveforms of such signals, as shown in FIG. 3, being indicated on the output terminals thereof. The signals of blocks 500–504 and 499 are supplied to various combinations of input leads 514–522 of the nine AND gates 505–513, which are primed during the time periods represented by the timing signals $y'_2-y'_4$ and $y_5-y_8$, generated by divider 406 and decoder 426.

In FIG. 10 AND gate 505 is primed by timing signal $y'_2$ and AND gate 506 by timing signal $y'_3$. A 32 kHz signal from source 501 is supplied to the other input 514 of AND gate 505 and passes through OR gate 435 to PSK section 109. By means of the phase lock loop logic of FIG. 9 described above, the 32 kHz signal supplied to PSK modulator 109 becomes synchronized with the 32 kHz component of the received signal, thereby removing it and leaving the RF carrier signal amplitude modulated by the PRS signal of FIG. 3D. The detector circuits in radio 111 remove the RF carrier and the PRS signal is supplied to correlator 400.

In a similar manner, the 32 kHz signal from source 501 is supplied through AND gate 506 during timing signal $y'_3$ and passes through OR gate 435 to PSK modulator 109 where continuing synchronization with, and removal of, the 32 kHz component of the received interrogation signal occurs. The RF carrier modulated by the PRS signal passes through AM section 108 without change and then through radio 111 where the carrier is removed, outputting the PRS signal to correlator 400.

The signal supplied to input 516 of AND gate 507 during time period $y'_4$ is a result of Exclusive-ORing the 32 kHz signal with the PRS signal as indicated in block 504 of FIG. 10 to produce the waveform of FIG. 3I. Such signal is supplied through AND gate 507 and OR gate 435 to PSK modulator 109 to demodulate the portion $Y'_4$ of the received signal, represented by waveform 3J of FIG. 3, and which was originally modulated by a similar signal at the interrogator. The output of PSK modulation circuit 109 is the RF carrier signal which is supplied through AM modulator 108 to radio 111. The $Y'_4$ portion of the received signal occurs during the counts 124 to 140 of divider 406.

At the count of 140 of divider 406, flip-flop 402 is reset, causing the logic of the transponder to change from a receiver to a transmitter in a manner to be discussed further in connection with FIG. 9. For now, assume that counter 406 continues its count to generate timing signal $Y_5$ during its count from 140 to 186, defining a time duration of 92 milliseconds. The timing signal $Y_5$ energizes both AND gates 508 and 509 with AND gate 508 passing the PRS signal through OR gate 525 to AM modulator 108 and with AND gate 509 passing the 32 kHz signal through OR gate 435 to PSK modulator 109.

When radio 111 becomes a transmitter it supplies an RF carrier signal to AM section 108 where it is amplitude modulated by the PRS signal 3D during time $y_5$. This amplitude modulated signal is then phase modulated by the 32 kHz signal passing through AND gate 509 and OR gate 435 to PSK modulator 109 to produce waveform 3E. The gaps of waveform 3E are produced by the lower levels of the PRS signal and the hatched sections represent the phase-shift modulation of the carrier signal by the 32 kHz signal. Specifically, in waveform 3E the hatching in one direction represents an RF carrier phase of 0° and the hatching in the opposite direction represents an RF carrier phase shift of 180°.

At count 186 in divider 406, timing signal $y_5$ terminates and timing signal $y_6$ commences to prime AND gate 510 to pass therethrough the 32 kHz signal Exclusive-ORed with the PRS signal 3D, supplied from block 504 of FIG. 10, and represented by waveform 3I. Such signal is then supplied through OR gate 435 to PSK modulator 109 to phase shift modulate the RF carrier of radio 111, thereby producing signal portion $Y_6$, represented by waveform 3J.

At the count of 226 in divider 406, timing signal $y_6$ terminates and timing signal $y_7$ begins. Timing signal $y_7$ primes AND gate 511 to pass therethrough a signal consisting of the locally generated 32 kHz signal Exclusive-ORed with the locally generated PRS signal. Such signal is supplied through OR gate 435 to PSK section 109 to phase modulate the carrier signal supplied by radio 111. At the count of 236 in divider 406, timing signal $y_7$ terminates and timing signal $y_8$ begins.

During the last portion $Y_8$ of the signal generated by the transponder, the divider 406 counts from 236 to 252 and primes both AND gates 512 and 513. The AND gate 512 passes a signal which is the product of the PRS signal 3D and the data bit signal 3F, as indicated in block 500.

AND gate 513 passes a 32 kHz signal therethrough during time $y_8$ and then through OR gate 435 to PSK modulator 109 to produce the resultant data carrying signal of FIG. 3H.

Returning again to the transponder logic of FIG. 9, the data generated by data source 437 is supplied through data buffer means 438 to Exclusive-OR gate 440 through AND gate 439, which is primed only during time period $y_8$. The output from PRS generator 427 is also supplied to Exclusive-OR gate 440 during time period $y_8$ and then through AND gate 630 to amplitude modulate the RF carrier signal in AM section 108. During time periods $y'_4$, $y_6$ and $y_7$ the PRS signal is supplied through AND gate 442 to Exclusive-OR gate 311 where it is Exclusive-ORed with the 32 kHz signal from generator 435, supplied through switched delay means 424 during time $y'_4$ and supplied through AND gate 465 and OR gate 458 during times $y_6$ and $y_7$, bypassing the switched delay means 424.

At this point in the description the transponder has received the interrogation signal from the interrogator and has become synchronized therewith and then, at the termination of the interrogation signal at the transponder, the transponder has generated a responsive signal $Y_5-Y_8$ during the time periods represented by the timing signals $y_5-y_8$, as shown in bar form in the lower portion of FIG. 2 and also in the chart of FIG. 4.

Next, in FIG. 11, the logic for tracking the response signal received by the interrogator from the transponder will be discussed, including the means by which the interrogator detects and becomes synchronized with the response signal from the transponder and finally, how the data bit phase of the $Y_7$ portion of the received response signal is compared with the data bit phase of the originally transmitted interrogator signal to determine the distance between the interrogator and the transponder.

In FIG. 11 those elements which correspond to elements shown in the interrogator logic of FIG. 7 are represented by the same reference character. New elements added in FIG. 11 are represented by new reference characters in a 600 series.

The received response from the transponder passes through AM section 102, PSK section 101, radio 100 and into correlator 230. The interrogator, having just transmitted an interrogation signal is expecting a response signal back from the transponder. Therefore, no "wake-up" portion corresponding to the $Y_1$ signal is generated by the transponder, nor expected by the interrogator. However, the $Y_5$ portion of the transponder response, which is the first section of the response signal, is expected and the locally generated tracking 32 kHz signal is being supplied to the PSK section 101. The received PRS signal component is supplied through modulator 105 and radio 100 to correlator 230 which responds thereto to reset dividers 610 and 611 to zero via lead 640. The resetting of dividers 610 and 611 to zero synchronizes the output of divider 611 with the period of the received iterative PRS signal.

The crystal oscillator 200 output is supplied to arithmetic synthesizer 605 at all times although the 32 kHz output of generator 620 is used only during the time periods $y'_5$, $y'_6$, $y'_7$ and $y'_8$. The AS 605, DAC 617, filter 618, zero crossing detector 619, and two-level signal generator 620 of FIG. 11 correspond in function to the AS 421, DAC 432, filter 433, zero crossing detector 434 and two-level signal generator 435 of the transponder logic of FIG. 9. Further, the switched delay 601, the dither oscillator 602, the synchronizing detector 603, the up/down counter 604 and the oscillator 200 of FIG. 11 correpond to the switched delay 424, the dither oscillator 423, the synchronous detector 410, the up/down control 422, and the crystal oscillator 420 of FIG. 9. The two structures are essentially identical and perform the same function when receiving a signal from the other station.

In FIG. 11, the 32 kHz output of signal generator 620 is supplied to switched delay 601 which switches said 32 kHz from generator 620 output to an early/late condition under control of dither oscillator 602, as discussed in connection with FIG. 9, when such 32 kHz signal is being compared in PSK modulation section 101 with the 32 kHz component of the received $Y'_5$ signal from the transponder. When synchronization is effected during time period $y'_5$ the 32 kHz component of the received $Y'_5$ signal is removed so that the only signal passing to the radio 100 is the RF carrier signal amplitude modulated by the PRS signal. The carrier is removed by the filtering section of the radio 100 thereby supplying only the PRS signal to the correlator 230. The output of radio 100 cannot be supplied directly to the synchronous detector 603 during time period y′$_5$ since the PRS signal has two distinct levels and could not be interpreted by synchronous detector 603. Accordingly, the PRS signal outputted from radio 100 is blocked from synchronous detector 603 by transmission gate 623 during time period y′$_5$.

During time period y′$_5$ the output of correlator 230 is supplied through peak detector 622, transmission gate 621, and then through OR gate 620 to synchronous detector 603. The peak detector 622 functions in the same manner as discussed in connection with the peak detector 452 of the transponder logic of FIG. 9.

Since the initiation of the interrogation signal by the interrogator, the divider (or counter) 207 in FIG. 11 has been continuously and time synchronously counting bit periods. At the termination of the interrogation signal, the counter 207 continues to count. Since the round-trip propagation time of a signal between the interrogator and the transponder is less than a bit length, the divider 207 will, with some phase shift, be actually counting the data bit periods of the signal received back from the transponder so that the time periods y′$_5$, y′$_6$, y′$_7$ and y′$_8$ generated by divider 207 are defined within the length of a 2 millisecond bit period.

Thus, at count 144, which represents the beginning of the time period y′$_5$, the interrogator logic of FIGS. 7 and 8 changes from a transmitter to the receiver of FIG. 11 by setting flip flop 225 which disables radio 100 and enables dither oscillator 602. The 32 kHz signal generated in the signal generator 620 of FIG. 11 during time period y′$_5$ passes through switched delay means, AND gate 607, and Exclusive-OR gate 631 to PSK section 101, where it will immediately begin to hunt for synchronism with the 32 kHz component of the received Y′$_5$ signal from the transponder by changing the phase of the arithmetic synthesizer 605 which determines the phase of the two-level 32 kHz signal generated by signal generator 620.

The means by which the phase of the arithmetic synthesizer (AS) 605 becomes locked to the phase of the 32 kHz component of the received signal is the same as was discussed in connection with the AS 421 of the transponder logic of FIG. 9. The accumulator of AS 605 of FIG. 11 is assumed to have fifteen bit positions, with the highest being the fifteenth bit position, and the lowest being the first bit position. Thus, if a one is loaded into the tenth bit position of the up/down frequency control counter, the upper six bit positions of the accumulator will function as a divide-by-64 device with an overflow occurring every sixty-four cycles of the output of the crystal oscillator 200.

This output is supplied to a digital-to-analog converte 617 and then to filter 618 to produce a sine wave. The sine wave is supplied to zero crossing detector 619 and then to two-level signal generator 620. The output of signal generator 620 is a two-level signal having a 32 kHz frequency which is equal to the overflow rate of the accumulator of AS 605, and whose positive zero crossings coincide with the overflowing of said AS accumulator. It is this 32 kHz two-level output signal from generator 620 that is compared with the two-level 32 kHz component of the received signal in PSK section 101 through switched delay means 601, AND gate 607 and Exclusive-OR gate 631.

To lock the phase of the output signal of generator 620 with that of the received 32 kHz signal component, the phase of the arithmetic synthesizer must be altered so that it is also locked therewith. As discussed above, such phase alteration can be done in very small increments. If the output of crystal oscillator 200 is supplied once to the first bit position (the lowest) of the up/down frequency control counter in AS 605 through up/down counter control 604, the phase of the AS accumulator is shifted $\frac{1}{2}^{15} \times 360°$ with each pulse supplied to such the accumulator, or 0.011°.

Since a full count cycle of bit period defining divider 64 represents a bit length of 2 ms, it follows that a single pulse supplied to the first bit position of AS 605 represents $\frac{1}{2}^{15} \times \frac{1}{2}^7$ or $\frac{1}{2}^{22}$ part of a 2 millisecond time interval. Phase lock between the arithemtic synthesizer 605 (and the output signal of generator 620) with the 32 kHz component of the received signal occurs during the time period y′$_5$.

During the next time period y′$_6$, AND gate 607 is primed and the 32 kHz output of generator 620 passes therethrough and then to Exclusive-OR gate 631. The PRS signal is also supplied to Exclusive-OR gate 631 through primed AND gate 442. Thus, the signal output from Exclusive-OR gate 631 consists of the PRS signal Exclusive-ORed with the 32 kHz signal shown as waveform 3I in FIG. 3 and defined in the chart of FIG. 4.

Consequently, that component of the received y′$_6$ signal consisting of the 32 kHz signal Exclusive-ORed with the PRS component is removed therefrom. The RF carrier is then removed from the received Y′$_6$ signal by radio 100 so that the output of radio 100 contains only a voltage produced by the effect of dither oscillator 602 (FIG. 11).

In FIG. 8 between the counts of 230 and 240, the y′$_7$ timing signal is generated and primes AND gate 607 of FIG. 11 to again supply the 32 kHz output from generator 620 therethrough and to Exclusive-OR gate 631. The PRS signal is also supplied to Exclusive-OR gate 631 through primed AND gate 442. The output of Exclusive-OR gate 631 is supplied to PSK section 101 to phase shift modulate the received Y′$_7$ portion of the received responsive signal from the transponder and thereby remove the product of the 32 kHz and PRS signal components from the received signal. The output of PSK section 101 is the RF carrier which is removed by radio 100 leaving only the voltage produced by the effect of dither oscillator 602.

It is during the reception of Y′$_7$ that complete phase lock between the locally generated 32 kHz signal from generator 620 and the 32 kHz component of the received signal occurs. As discussed above, phase lock can occur between the two 32 kHz signals to one part in $\frac{1}{2}^{22}$ of a 2 millisecond time interval.

Since a radio signal will propagate approximately 374 miles in 2 ms, a single pulse supplied to the first bit position of the up/down frequency control counter of AS 605 represents a propagation distance increment of $\frac{1}{2}^{22} \times 374$, or approximately six inches. Further, since the 374 miles represents a round-trip propagation distance, the theoretical resolution of range determination is three inches. The foregoing calculations are, of course, based upon the assumption of perfect phase lock between the output of the signal generator 620 and the 32 kHz component of the received signal, and no delays other than propagation time.

By repeatedly supplying pulses from oscillator 200 to the accumulator of AS 605, the phase of the accumulator can be shifted any desired amount in increments of 0.011° until phase lock with the 32 kHz component of the received responsive signal is achieved.

At a given instant of time the count in the upper counting chain 331 is strobed and compared in binary counter 600 with the count in the lower counting chain 615. The phase difference between the bit interval originally transmitted from the interrogator with respect to the bit interval received at the interrogator is then determined with the aforementioned precision of one part in $\frac{1}{2}^{22}$ of the 2 millisecond bit interval. Since phase difference is proportional to propagation time which in turn is proportional to distance, the distance between the interrogator and the transponder can be easily calculated in distance calculation and display means 641.

Finally, the last portion $Y'_8$ of the signal from the transponder is received and occurs during the time defined by the signal $y'_8$ generated by counter 207 of FIG. 8. In FIG. 11 the $y'_8$ timing signal primes AND gate 607 to pass the 32 L kHz signal from generator 620 therethrough and through Exclusive-OR gate 631 to PSK section 101 where the 32 kHz component of the received responsive signal is removed. The output of PSK section 101 consists of the RF carrier which is amplitude modulated by the product of the PRS signal and the encoded data, as shown in FIG. 2, and as represented by waveform 3H. The RF carrier is removed from waveform 3H by radio 100 so that the signal supplied to the correlator 230 of FIG. 11 is the two-level signal of waveform 3G which is the product of the PRS sequence and the data. The correlator output is supplied to peak detector 622, through transmission gate 621, primed by timing signal $y'_8$, and then through OR gate 620 to synchronus detector 603 to maintain synchronization. The maximum output of peak detector 622 indicates maximum phase lock between the received and locally generated 32 kHz signals. The output of correlator 230 is also supplied through AND gate 240, primed by timing signal $y'_8$, to data bit demodulator 241 which detects the polarity of the output signal from correlator 230 and thereby reconstructs the transmitted data.

The generation of the tracking signals at the interrogator during the reception of signal portions $Y'_5$–$Y'_8$ from the transponder is also shown in FIG. 8 during time periods $y'_5$–$y'_8$. The four AND gates 306, 307, 308 and 309 are primed during time periods $y'_5$–$y'_8$, respectively, to pass the tracking 32 kHz signal generated locally in generator 620 of FIG. 11 therethrough and then through OR gate 311 to PSK section 101.

It is to be noted that only portion $Y'_8$ of the signal received from the transponder contains data information. The actual measurement of the distance between the interrogator and the transponder is made during the reception of signal portion $Y'_7$.

While particular modulation sequences have been described herein for the interrogation and responsive signals in a preferred embodiment of the invention, other modulation sequences can also be employed, using various combinations and types of modulations of the carrier signal by the PRS and 32 kHz signals. Generally, each successive type of modulation should enable a greater tracking precision which in most cases would require increasing amounts of energy in the signal. As one example, the functions of $Y_7$ and $Y_8$ can be interchanged.

I claim:

1. A range finding system comprising:
    interrogation means for generating and transmitting an interrogation signal having at least one portion comprising a first carrier signal modulated by a signal which is a concurrent function of a first two-level tone of frequency $f_T$ and a first iterative two-level pseudo random sequence whose level transitions are coincident with level transitions of said first two-level tone;
    responding means for receiving said interrogation signal and for generating a first tracking signal which identifies the propagation delayed phases of said first tone and said first pseudo random sequence;
    said responding means further comprising means for generating a responsive signal comprising a second carrier signal modulated by signal which is a concurrent function of a second two-level tone of frequency $f_T$ and a second iterative psuedo random sequence whose phases are the same as the propagation delayed phases of said first tone and said first pseudo random sequence;
    said interrogation means further comprising:
        logic means for receiving said responsive signal, for generating a second tracking signal which identifies the propagation delayed phases of said second two-level tone and said second pseudo random sequence,
        and for determining the phase difference between said interrogation signal before transmission thereof and said second tracking signal; and
        means for computing the distance between said interrogation means and said responding means from said phase difference.

2. A range determining means in accordance with claim 1 in which said logic means comprises:
    first counting means for continuing to generate said first tone with its phase unchanged after transmission of said interrogation signal;
    arithmetic frequency synthesizer means for generating an overflow output signal at a rate substantially equal to $f_T$;
    means for phase locking the overflow output signal of said arithmetic frequency synthesizer with the phase of said received second tone;
    second and third counting means responsive, respectively, to said continued first tone and to said second tracking signal to determine phase relation between said first iterative pseudo random sequence and said propagation delayed second iterative pseudo random sequence; and
    means for taking the difference between the count of said first counting means and the count of said arithmetic frequency synthesizer means at a given time which occurs at a change of count of said first counting means and
    further for taking the difference between the counts of said second and third counting means at said given time.

3. A system as in claim 1 in which said interrogation means and said responding means each further comprises:
    antenna means; and
    radio transceiver means having a nominal intermediate center frequency $f_i$ and a nominal intermediate frequency pass band of sufficient width to pass therethrough received carrier signals amplitude modulated by a received pseudo random sequence.

4. A range determining means in accordance with claim 3 in which said logic means comprises:
   first counting means for continuing to generate said first tone with its phase unchanged after transmission of said interrogation signal;
   arithmetic frequency synthesizer means for generating an overflow output signal at a rate substantially equal to $f_T$;
   means for phase locking the overflow output signal of said arithmetic frequency synthesizer means with the phase of said received second tone;
   second and third counting means responsive, respectively, to said continued first tone and to said second tracking signal to determine the phase relation between said first iterative pseudo random sequence and said propagation delayed second iterative pseudo random sequence;
   means for taking the difference between the count of said first counting means and the count of said arithmetic frequency synthesizer means at a given time which occurs at a change of count of said first counting means and
   further for taking the difference between the counts of said second and third counting means at said given time.

5. A system as in claim 1 in which said responding means further comprises:
   correlation means responsive to said first iterative pseudo random sequences of said interrogation signal to produce correlation pulses; and
   control means comprising first signal generating means responsive to said correlation pulses to produce a signal having a repetition rate equal to the repetition rate of said first iterative pseudo random sequences and in phase with the period thereof and to identify the beginning of a second portion of said received interrogation signal;
   said control means further comprising a second signal generating means responsive to the second portion of said received interrogation signal to generate a signal which is phase synchronous with said first two-level tone component of said interrogation signal.

6. A system as in claim 1 in which said interrogation means further comprises:
   correlation means responsive to said second iterative pseudo random sequences of said received responsive signal to produce correlation pulses; and
   control means comprising first signal generating means responsive to said correlation pulses to produce a signal having a repetition rate equal to the repetition rate of said second iterative pseudo random sequences and in phase with the period thereof and to identify the beginning of a second portion of said received responsive signal;
   said control means further comprising a second signal generating means responsive to the second portion of said received responsive signal to generate a signal which is phase synchronous with said second two-level tone component of said received responsive signal.

7. A method for finding the distance between an interrogation means and a transponder means comprising the steps of:
   generating and transmitting an interrogation signal comprising a carrier signal modulated by a signal which is a concurrent function of a first two-level tone of frequency $f_T$ and a first iterative two-level pseudo random sequence whose level transitions are coincident with level transitions of said first tone;
   responding to said interrogation signal at said transponder means to generate a first tracking signal which identifies the times of occurrence of the propagation delayed phases of said first tone and said first pseudo random sequence;
   generating and transmitting a responsive signal comprising a carrier signal modulated by a signal which is a concurrent function of a second two-level signal of frequency $f_T$ and a second iterative pseudo random sequence whose phases are the same as the propagation delayed phases of said first tone and said first pseudo random sequence;
   receiving said responsive signal at said interrogation means;
   generating a second tracking signal at said interrogation means which identifies the times of occurrence of the propagation delayed phases of said second tone and said second pseudo random sequence;
   determining the phase difference of said first pseudo random sequence before transmission thereof and the propagation delayed second pseudo random sequence; and
   computing the distance between said interrogation means and said transponder means from said phase difference.

8. A method for finding the distance between an interrogation means and a transponder means comprising the steps of:
   generating and transmitting an interrogation signal of at least two successive portions;
   first and second portions comprising a carrier signal amplitude modulated by a first iterative two-level pseudo random sequence whose level transitions are coincident with level transitions of a first two-level tone of frequency $f_T$;
   said second portion being further phase shift modulated by said first two-level tone;
   said third portion being phase shift modulated by the product of said first tone and said first pseudo random sequence;
   responding to said interrogation signal at a transponder to generate a first tracking signal having first and second signal components;
   phase locking the phases of said first and second signal components with the propagation delayed phases of said first tone and said first pseudo random sequence;
   generating and transmitting a responsive signal comprised of two successive responsive portions;
   the first responsive portion being a carrier signal amplitude modulated by a second iterative pseudo random sequence and phase shift modulated by a second two-level tone of frequency $f_T$;
   the second portion being phase shift modulated by the product of said second two-level tone and said second pseudo random sequence;
   phase locking said second two-level tone and said second pseudo random sequence with the propagation delayed phases of said first tone and said first pseudo random sequence;
   receiving said responsive signal at said interrogation means;
   generating a second tracking signal at said interrogation means;

phase locking a first and second signal component of said second tracking signal with the propagation delayed phases of said second two-level tone and said second pseudo random sequence;

determining the phase difference of said first pseudo random sequence before transmission thereof and the propagation delayed second pseudo random sequence; and computing the distance between said interrogation and said transponder means from said phase difference.

9. A radio for use in a system of the type in which a first radio station transmits a first carrier modulated by a first code sequence to a second radio station, said first code sequence including a plurality of successive cycles of a given pseudo random code which occur in time synchronism with a time reference at said first station; in which said second station receives said modulated first carrier after a certain propagation time delay which is short relative to a cycle period of said given pseudo random code sequence; in which said second station transmits a second carrier modulated by a second code sequence to said first station, said second code sequence including a plurality of successive cycles of said given pseudo random code which are phase locked with said pseudo random code of said first code sequence received by said second station; and in which said first station receives said modulated second carrier after a certain propagation time delay and then determines said range between said stations in accordance with the phase delay between said pseudo random code received by said first station and said pseudo random code transmitted from said first station; the improvement wherein a radio station for use in said ranging system comprises:

a tone source generating a tone at a given frequency which is low relative to the frequency of the carrier of that station;

a pseudo random code generating means responsive to said tone for repetitively deriving a pseudo random code consisting of a predetermined number of successive binary code chips with the code chip period of said pseudo random code being equal to a period of said tone; and modulation means for modulating the carrier of that station during at least one certain portion of said code sequence of that station with a modulating signal that is a preselected concurrent function of both said tone and said pseudo random code.

* * * * *

UNITED STATES PATENT AND TRADEMARK OFFICE
CERTIFICATE OF CORRECTION

PATENT NO. : 4,278,977

DATED : July 14, 1981

INVENTOR(S) : Edward Joachim Nossen

It is certified that error appears in the above-identified patent and that said Letters Patent is hereby corrected as shown below:

Column 9, line 56, "chan" should be ---chain---

Column 10, line 28, delete "shift" and insert ---shifted .011° (1/2$^{15}$ x 360° = .011°) in---

Column 12, line 14, after "divider" insert ---207.---

Column 14, line 43, "way" should be ---may---

Column 20, line 53, "correpond" should be ---correspond---

Signed and Sealed this

Second Day of February 1982

[SEAL]

Attest:

GERALD J. MOSSINGHOFF

Attesting Officer     Commissioner of Patents and Trademarks